(12) United States Patent
Daykin

(10) Patent No.: US 9,644,658 B2
(45) Date of Patent: May 9, 2017

(54) EXTENSIBLE FIXING DEVICE

(71) Applicant: Stanley Pritchard Daykin, Trwobridge (GB)

(72) Inventor: Stanley Pritchard Daykin, Trwobridge (GB)

(73) Assignee: UK BUILDING PRODUCTS LIMITED, Westbury, Wiltshire (GB)

( * ) Notice: Subject to any disclaimer, the term of this patent is extended or adjusted under 35 U.S.C. 154(b) by 171 days.

(21) Appl. No.: 14/644,155

(22) Filed: Mar. 10, 2015

(65) Prior Publication Data

US 2016/0084287 A1    Mar. 24, 2016

(30) Foreign Application Priority Data

Sep. 18, 2014 (GB) .................................. 1416520.3
Mar. 2, 2015 (EP) .................................. 15157164

(51) Int. Cl.
*F16B 13/10* (2006.01)
*F16B 13/08* (2006.01)
*F16B 37/04* (2006.01)

(52) U.S. Cl.
CPC ...... *F16B 13/0808* (2013.01); *F16B 13/0833* (2013.01); *F16B 37/042* (2013.01)

(58) Field of Classification Search
CPC ........................... F16B 13/0808; F16B 19/109
USPC ................................ 411/340, 546, 535, 347
See application file for complete search history.

(56) References Cited

U.S. PATENT DOCUMENTS

| 1,159,360 | A | | 11/1915 | Clauss | |
|---|---|---|---|---|---|
| 1,520,123 | A | * | 12/1924 | Gillen | B62D 1/16 411/344 |
| 1,541,362 | A | | 6/1925 | Locke | |
| 2,597,857 | A | * | 5/1952 | Patsy | B25B 31/005 411/344 |
| 2,877,818 | A | | 3/1959 | Johnson | |
| 3,127,808 | A | * | 4/1964 | Drybread, Sr. | F16B 13/0808 411/346 |
| 3,168,850 | A | * | 2/1965 | Tennican | F16B 13/0808 411/342 |
| 3,241,420 | A | * | 3/1966 | Passer | F16B 13/0808 411/346 |
| 4,828,439 | A | | 5/1989 | Giannuzzi | |
| 4,834,601 | A | * | 5/1989 | Schaap | F16B 13/00 411/173 |
| 5,346,349 | A | | 9/1994 | Giovannetti | |
| 7,628,366 | B2 | | 12/2009 | Scott | |
| 7,736,108 | B1 | * | 6/2010 | Bruce | F16B 13/0808 411/340 |

(Continued)

FOREIGN PATENT DOCUMENTS

DE 1232223 10/1968
EP 0180532 A1 10/1985

(Continued)

*Primary Examiner* — Flemming Saether
(74) *Attorney, Agent, or Firm* — Crose Law LLC; Bradley D. Crose

(57) ABSTRACT

The present invention relates to a fixing device and finds particular, although not exclusive, utility in providing an anchoring point in plasterboard cavity walls or ceilings for the purpose of affixing other items thereto, in which the fixing device may be used in plasterboard walls of varying thickness without risk of over-insertion and loss of the fixing device in the cavity behind the plasterboard.

19 Claims, 11 Drawing Sheets

(56) References Cited

U.S. PATENT DOCUMENTS

| | | | |
|---|---|---|---|
| 8,277,159 B2* | 10/2012 | Stimpson | F16B 13/0808 411/349 |
| 9,506,494 B2* | 11/2016 | Vullings | F16B 5/0642 |
| 2005/0019132 A1 | 1/2005 | Diaz | |
| 2006/0024143 A1 | 2/2006 | Wei | |
| 2006/0024148 A1 | 2/2006 | Wei | |
| 2006/0222474 A1 | 10/2006 | Brown et al. | |
| 2009/0103999 A1* | 4/2009 | Fucito | F16B 13/0808 411/342 |
| 2009/0113776 A1 | 5/2009 | Van Bortel | |
| 2013/0039715 A1 | 2/2013 | Daykin et al. | |
| 2014/0075882 A1 | 3/2014 | Porter | |

FOREIGN PATENT DOCUMENTS

| | | |
|---|---|---|
| GB | 2052668 A | 1/1981 |
| GB | 2268240 A | 1/1994 |
| GB | 2297595 A | 8/1996 |
| GB | 2387633 A | 10/2003 |
| GB | 2484771 A | 4/2012 |

* cited by examiner

Figure 14
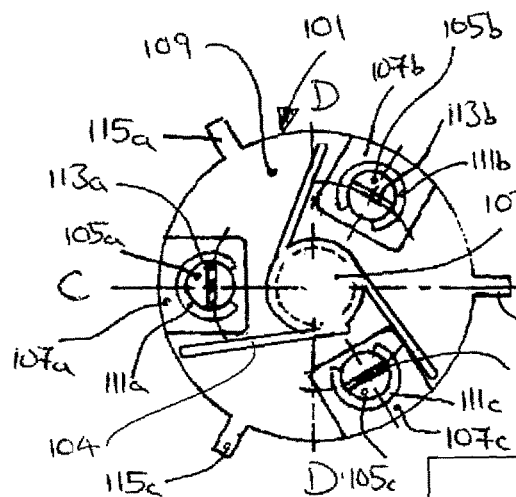
Figure 15
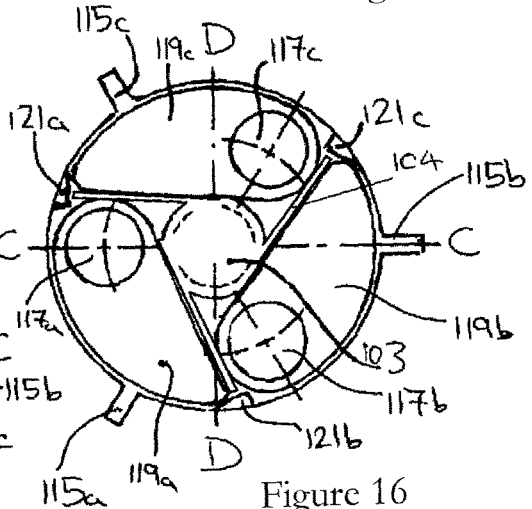
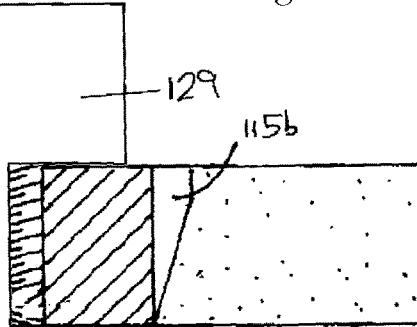
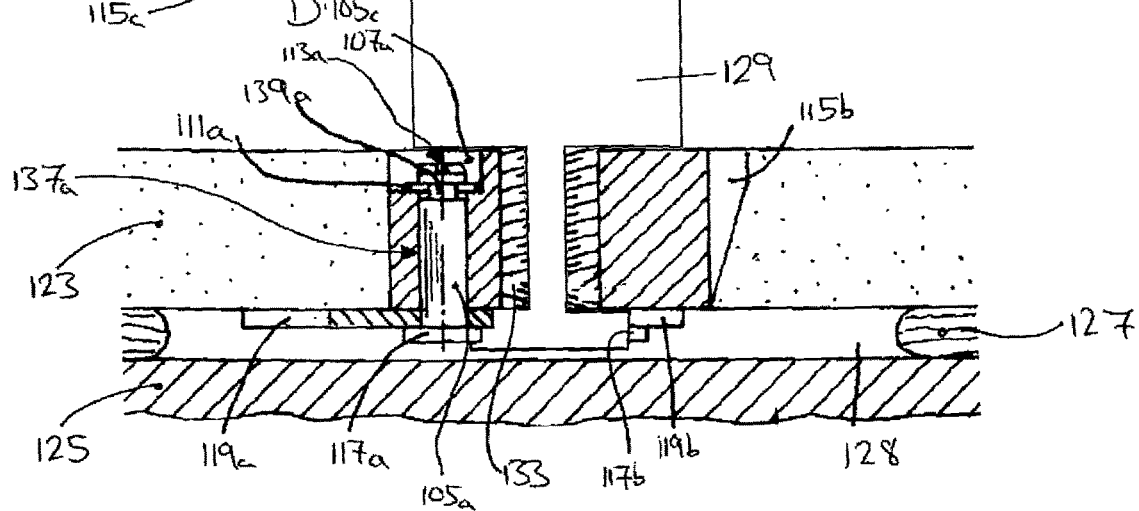
Figure 17
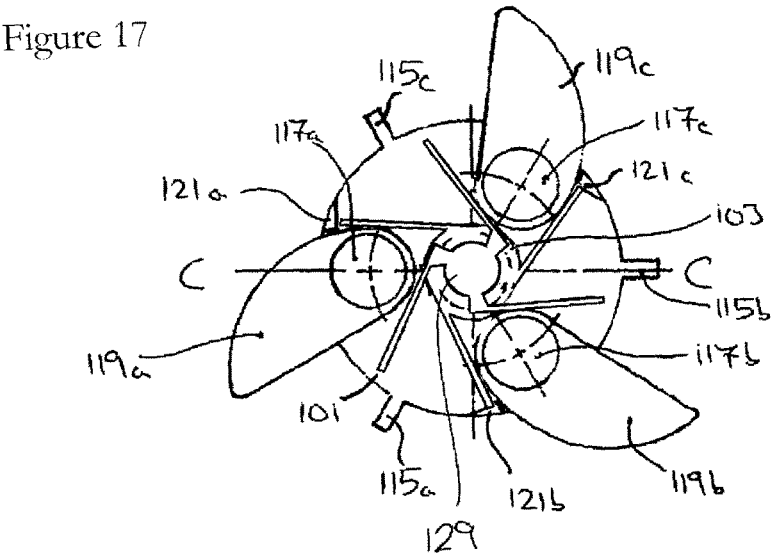
Figure 16

Figure 22
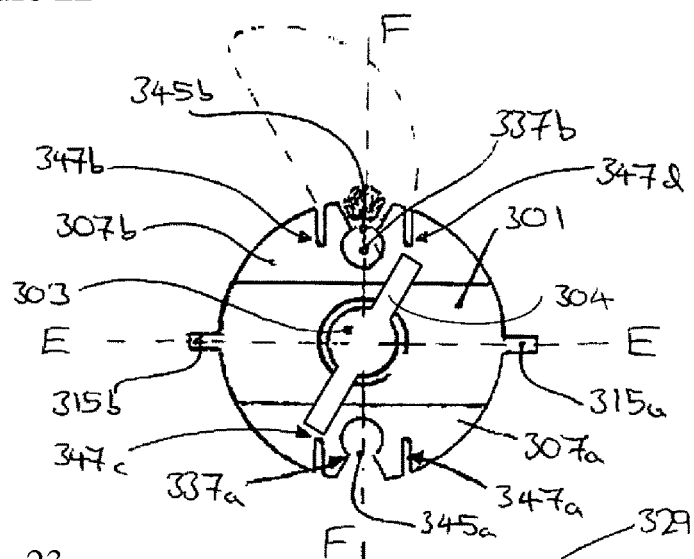
Figure 23
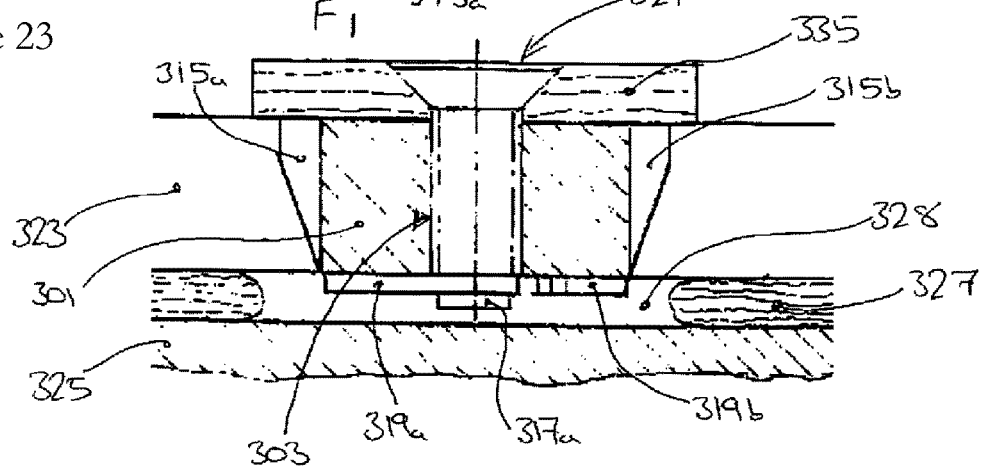
Figure 24
Figure 25
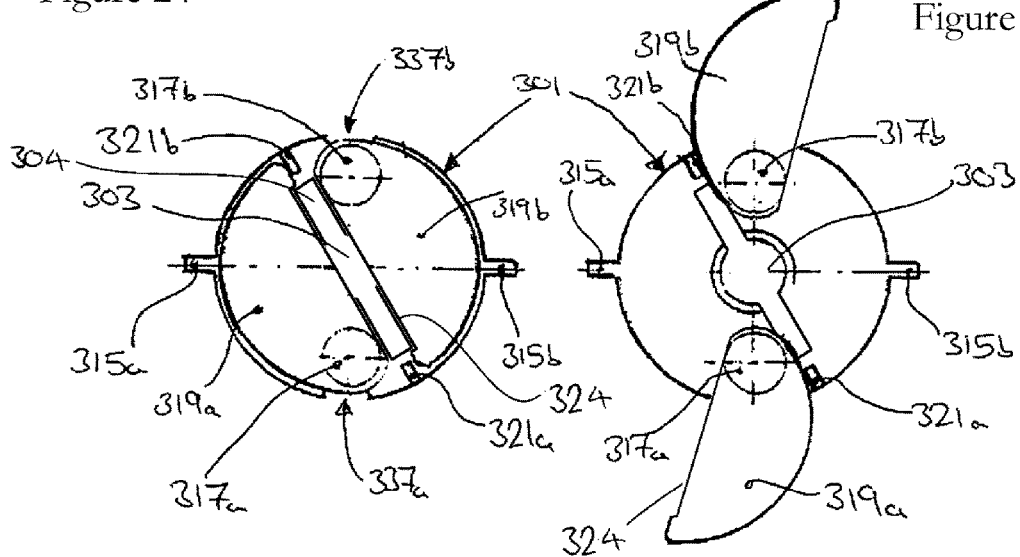

Figure 30
Figure 31
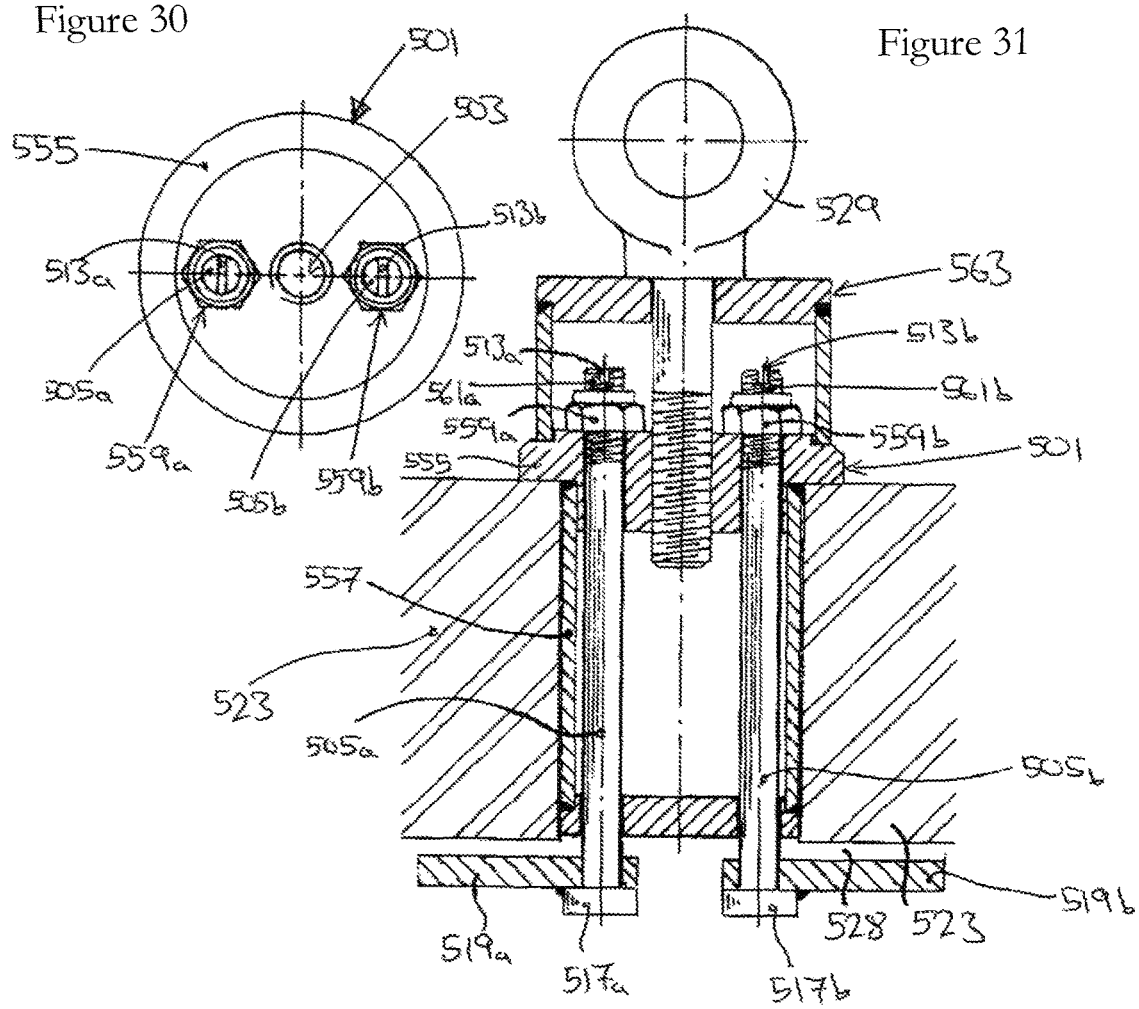
Figure 32
Figure 33
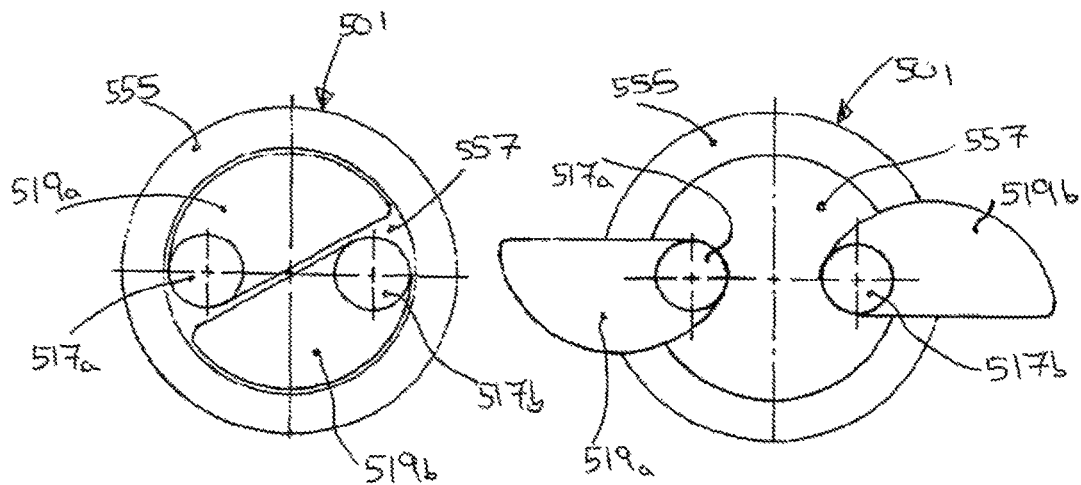

EXTENSIBLE FIXING DEVICE

CROSS-REFERENCE TO RELATED APPLICATION(S)

The present non-provisional patent application claims the benefit of priority of GB1416520.3, which is entitled "FIXING SYSTEM" and having a priority date of Sep. 18, 2014 and which is incorporated in full by reference herein and EP15157164.3, which is entitled "FIXING SYSTEM" and having a priority date of Mar. 2, 2015, and which is incorporated in full by reference herein.

FIELD OF THE INVENTION

The present invention relates to a fixing device and finds particular, although not exclusive, utility in providing an anchoring point in plasterboard cavity walls or ceilings for the purpose of affixing other items thereto.

BACKGROUND OF THE INVENTION

GB2484771 discloses a fixing device for securing into a hole in plasterboard, comprising: a body having an anchor receiving aperture, and a passage that extends within the body, spaced from the anchor receiving aperture; a shaft provided within the passage, the shaft being rotatably movable, independent of axial movement, within the passage; and retaining means coupled to the shaft and configured to be movable between an extended position, in which the fixing device is retainable in said hole, and a retracted position, in which the fixing device is removably insertable into said hole.

The fixing device may be operated, once it has been inserted into a hole in a structure, by moving the retaining member to the extended position. For instance, a hole may be drilled in a plasterboard structure for insertion of the fixing device axially therein. The fixing device may be inserted into the hole from the front face of the plasterboard, such that the retaining members are behind the rear face of the plasterboard. Rotating the shaft causes the retaining member to move from its retracted position (i.e. its ambush position, in which it sits within the axial profile of the body) to its extended position (in which it projects radially away from the body). In the extended position, the retaining member therefore substantially inhibits movement of the fixing device through the hole in the plasterboard, thus preventing removal of the fixing device from the front face of the structure. If the fixing device is recessed within the hole (either by over-insertion or if the body has a depth less than the thickness of plasterboard), then the retaining member can be drawn tight against the rear face of the plasterboard by fixing a plate (which could be, for instance, part of a hook or bracket for attachment to the plasterboard) to the front face with an anchor, received within the anchor receiving aperture. Specifically, the anchor may draw the plate and the fixing device toward each other, thereby drawing the retaining member tight against the rear face, and drawing the plate tight against the front face.

Different thicknesses of plasterboard require insertion of this form of fixing device to different depths. However, skill is required in determining this depth and accidental over-insertion of the fixing device, such that the device is lost into a cavity behind the plasterboard, is a common risk.

BRIEF SUMMARY OF THE INVENTION

According to a first aspect of the present invention, there is provided a fixing device for securing into a hole in plasterboard, the fixing device comprising: a body comprising: an anchor receiving aperture in a first face of the body; and a passage that extends within the body from the first face to a second face opposite the first face, the passage being spaced from the anchor receiving aperture; a shaft provided within the passage and extending from the first face to the second face, the shaft being rotatably movable within the passage; a retaining member coupled to the shaft adjacent to the second face, and configured to be movable between an extended position, in which the fixing device is retainable in said hole, and a retracted position, in which the fixing device is removably insertable into said hole; and at least one over-insertion stop arranged to project away from the body in a direction substantially parallel to the first face such that over-insertion of the body into a hole is prevented; wherein the over-insertion stop is configured to be moveable between a first position adjacent to the first face of the body, and a second position spaced from the first face of the body in a direction away from the second face of the body, such that the body is insertable into a hole to a depth greater than a distance between the first face and the second face.

In this way, the body of the fixing device may be inserted into a hole in a, for instance plasterboard, wall such that the retaining members may be extended to hold the fixing device in the wall. The over-insertion stops prevent over-insertion of the body into the hole and subsequent loss of the fixing device into a cavity behind the plasterboard. Movement of the over-insertion stops allows the fixing device to be used with a variety of thicknesses of plasterboard wall.

Specifically, on a plasterboard wall having a thickness greater than the depth of the body, the body may be inserted into a hole up to a depth equal to the depth of the body plus the distance between the first and second positions of the over-insertion stop; however, insertion beyond this depth is prevented, and therefore loss of the fixing device into a cavity behind the plasterboard is prevented.

In contrast, on a wall having a thickness equal to the depth of the body, the over-insertion stops may be maintained in the first position adjacent to the first face of the body; thus, the retaining members engage with a rear face of the plasterboard, while the over-insertion stops engage with a front face of the plasterboard. If the body is over-inserted into the plasterboard, then movement of the over-insertion stops permits the body to move down into the hole by a distance equal to the depth of the body plus the distance between the first and second positions of the over-insertion stop; however, the over-insertion stops prevent loss of the fixing device into the cavity behind the plasterboard.

Accordingly, the present invention provides a fixing device that may be used over a range of plasterboard wall thicknesses, but without the risk of the fixing device being lost into a cavity behind the plasterboard.

The fixing device may further comprise a collar on which the over-insertion stop is provided, the collar configured to slidably receive the body therein.

In alternative embodiments, the fixing device may comprise a runner, or a plurality of runners, moveable within the body upon which the over-insertion stop is provided.

The collar may further comprise an interior flange and/or the body may further comprise an exterior flange. The interior and exterior flanges may be arranged to cooperate such that movement of the over-insertion stop beyond the second position is prevented.

In fact, in all embodiments movement of the over-insertion stop beyond the second position may be prevented. Moreover, movement of the over-insertion stop beyond the first position may be prevented; in particular movement of the over-insertion stop may be limited to between the first and second positions, and various means and mechanisms for achieving this are envisaged. However, in preferred embodiments movement of the over-insertion stop beyond the first position may be permitted, such that the fixing device may be disassembled (for instance by removing the body from the collar) and/or re-assembled.

The interior of the collar may have a profile that substantially conforms to that of the exterior of the body, such that smooth and/or sliding motion of the collar relative to the body is enabled. In particular the collar and/or the body may comprise corresponding rails and respective grooves to guide relative movement therebetween.

The fixing device may comprise a single over-insertion stop, which may run around a periphery of the body. Alternatively or additionally, the fixing device may comprise a plurality of over-insertion stops, which may be spaced around a periphery of the body.

The fixing device may be a single unit, or a kit of individual pieces, comprising: an actuation member (which comprises the shaft coupled to the retaining member, as described above), and the body described above. The fixing device may be suitable for securing into structures other than plasterboard, such as dry-lining, insulated plasterboard, cladding materials, masonry brick and concrete block walls. The fixing device may be suitable for securing loads of up to 45 kg in a vertical wall. The fixing device may be suitable for securing loads of up to 75 kg in a vertical wall. The fixing device may be either releasably securable, such that it may be reused, or non-releasably securable, such that release of the fixing device is only possible via sacrificial damage to one or more of the components of the fixing device. For instance, application of a force on the fixing device of greater than 750N parallel to the axis of the anchor receiving aperture may cause the coupling between the retaining member and the shaft to fail, thereby facilitating release of the fixing device from the structure.

The body may be substantially circular in cross-section, for convenient insertion into a circular hole drilled into a structure. However, other shapes are contemplated, such as rectangular, square and hexagonal, or other polygonal forms. The body may be substantially cylindrical in order to maximise the surface area of contact with the structure, when inserted into a circular hole, thereby achieving maximum friction between fixing device and structure for preventing relative movement.

The body may have a diameter between approximately 13 mm and 25 mm. The diameter may be approximately 13 mm, 16 mm, 20 mm or 25 mm. In some embodiments, the diameter of the body on its rear face may be slightly less than the diameter of the body on its front, by for instance 0.2 mm. The depth of the body may match a standard thickness of plasterboard, such as between 9 mm and 18 mm. Preferably, it may be 9.5 mm, 11 mm, 11.5 mm, 12 mm, 12.5 mm, 15 mm or 15.5 mm so that the body will neither be proud of, nor recessed in, the surface of the plasterboard, when in use. However, it is envisaged that a body having a given depth may be used on any thickness of plasterboard, especially if that thickness is greater than the depth of the body. The diameter and depth of the body can be configured to accept different sizes and types of anchor. For instance, a larger anchor may require not only a larger anchor receiving aperture, but also a larger body.

The body may be formed from a plastics material, preferably by moulding, or from any ferrous and non-ferrous metals, white metal alloys, ceramics, lignocellulosic materials, etc.

The anchor receiving aperture may be a hole suitable for receiving an anchor therein. The anchor receiving aperture is distinct from the shaft. The anchor receiving aperture may be between 4.5 mm and 6.8 mm in diameter. The anchor receiving aperture may be 4.5 mm, 6.5 mm or 6.8 mm in diameter. The anchor receiving aperture may be threaded, for insertion of a complementary anchor such as a bolt or screw. The thread may be integrally moulded with the body, or may be provided in a threaded insert to the body. A threaded screw could cut into an internal wall of the anchor receiving aperture, thereby producing a complementary internal thread. Alternatively, the anchor receiving aperture may be splined, for ease of manufacture. The splines may project inwardly from the circumference of the anchor receiving aperture a distance of between 1 mm and 1.25 mm. The anchor receiving aperture may comprise multi-pointed splines. The anchor receiving aperture may be located centrally in the body.

The anchor may be a nail, a screw, a bolt, or similar fastener that is suitable for fastening any item to the fixing device. Alternatively, the anchor may be a forged steel eye bolt or other fastening for further securing a component to it.

The passage may be manufactured without an internal thread. Accordingly, manufacture is easier, and the cost of production can be decreased. Similarly, the shaft may be manufactured without an external thread. Again, the manufacture of an unthreaded shaft is both easier and cheaper than the manufacture of a threaded shaft. This is especially true when considering the high tolerances involved in the production of complementary threads. Even in the case in which both passage and shaft are threaded, if the threads are not complementary (i.e. if they do not co-operatively engage with one another) assembly of the fixing device is simplified over prior art devices. In particular, the retaining member may be coupled to the shaft before insertion into the passage. Accordingly, damage to the body will not result from the welding process, and excess glue will not bond to the threads of the passage if the coupling is by gluing.

The passage may be threaded (i.e. it may have a helical groove/ridge provided on its inner surface); however, in a preferred embodiment, the passage is not threaded, for ease of manufacture. The passage may have a smooth bore. The passage may be spaced from the edge of the body by between 0.775 mm and 2.15 mm. The passage may be spaced from the edge of the body by 0.775 mm, 1.15 mm, 1.525 mm or 2.15 mm. The passage may be disposed in a recess in the body. The recess may be in a substantially circular face of the body, for instance the front face. The recess may have a maximum extension inwardly from the circumferential edge of the body of between 4 mm and 7.5 mm. The recess may have a maximum extension inwardly from the circumferential edge of the body of 4.1 mm, 4.5 mm, 5.75 mm or 7.5 mm. In this way, one end of the shaft may remain within the recess so as not to project beyond a surface of the body. The recess may be shaped to form a guide rail in the body, to aid automatic orientation of the casing during automatic assembly. The guide rail may be substantially rectangular in form, and have a width of between 5 mm and 10 mm. The guide rail may have a width of 5.2 mm, 7 mm, 8.5 mm or 10 mm. The passage may pass through the body. The passage may pass from one side of the body to another opposed side. For example, the passage may pass from a substantially circular face of the body to an opposing substantially circular face. The passage may have a circular cross-section, for axial insertion of the shaft therein, which may provide free rotation of the shaft within the passage. The passage may have a diameter of between 2.25 mm and 3.5 mm. The passage may have a diameter of 2.25 mm, 2.75 mm or 3.5 mm. Alternatively, the passage may be open sided, for facilitating radial insertion of the shaft therein. The passage may be a keyhole shape, having a cross-section that is defined by a circle abutting a dovetail shape at its narrowest part. Insertion of the shaft into the passage may be via a press-fit from the wide part of the dovetail, into the circle, via the constriction of the narrow part of the dovetail. A further slot may be provided in the surface of the body, adjacent and having an axis parallel to that of the passage. The slot may enable resilient biasing of the dovetail constriction for insertion of the shaft. The shaft may therefore be maintained within the passage due to a larger diameter of the shaft compared to the width of the dovetail constriction. Free rotation of the shaft within the passage may be provided. In this way, it may be possible to couple the shaft to the retaining member before inserting it into the passage.

The shaft may have a diameter of 2.2 mm and 3.5 mm. The shaft may have a diameter of 2.2 mm, 2.25 mm, 2.75 mm or 3.5 mm. The shaft may have a diameter less than 0.05 mm less than the diameter of the passage. The shaft may have a length chosen to correspond to the depth of the body. In one embodiment, the shaft may be 13.2 mm long, for a body of depth of 11.5 mm. The shaft may be threaded (i.e. it may have a helical groove/ridge provided on its exterior surface), although not in such a way as to form a complimentary thread to any thread in the passage. However, in a preferred embodiment, the shaft is substantially not threaded (i.e. unthreaded or smooth along at least a substantial part of its length), for ease of manufacture. The shaft may have limiting means for limiting relative axial movement of the shaft within the passage. The limiting means may be a limiting apparatus. The limiting means may substantially inhibit any relative axial movement of the shaft within the passage. Alternatively, the limiting means may permit relative axial movement of the shaft within the passage of up to 1.5 mm, preferably approximately 1.2 mm. The limiting means may be an enlarged head. For instance, at an end of the shaft opposite the retaining member may be located an approximately cylindrical body, co-axial with the shaft and having a diameter larger than that of the shaft. Alternatively, the limiting means may be a non-helical, circumferential, annular or ring-like groove around the shaft provided with a spring-clip or circlip engaged therein. The groove may have a depth of between 0.375 mm and 0.6 mm, preferably 0.375 mm, 0.425 mm or 0.6 mm. The groove may have a depth of approximately 1.2 mm. The groove may be spaced from one end of the shaft by approximately 1.5 mm. The spring-clip or circlip may be manufactured from carbon steel that is phosphate and oil finished. The spring-clip or circlip may be manufactured from stainless steel or beryllium copper. The limiting means may comprise the shaft being at least partially threaded, and a nut received thereon, such as a nyloc nut. The spring-clip, circlip, nut, or other limiting means may be removable from the shaft.

The shaft may have actuation means for moving the retaining means between the extended position and the retracted position. The actuation means may be an actuator. The actuation means may be a screw drive, for instance a slot, cross, Phillips®, Pozidrive®, hex or similar screw drive.

The retaining member may be movable between the retracted position and the extended position by axial rotation of the shaft within the passage.

The retaining member may be rigidly coupled to one end of the shaft, such as by welding or gluing; however, welding is preferred due to the increased strength provided. The retaining member may comprise a hole for receiving the shaft, and the shaft may comprise a flange against which the retaining member can be abutted for rigid coupling. The hole may have a diameter the same as the diameter of the shaft. The flange may have a diameter of between 3.5 mm and 6 mm. The flange may have a diameter of approximately 3.5 mm, 5 mm or 6 mm. The flange may have a thickness of 1 mm. The shaft may comprise knurling adjacent the flange, to improve frictional contact between the shaft and the retaining member. The hole of the retaining member and the flange of the shaft arrangement may be configured to be countersunk; i.e. the hole may be shaped to receive the flange therein, such that the shaft does not project behind the retaining member. In one embodiment, the flange is configured in the shape of a truncated cone, and the hole has a corresponding profile for contact with the curved surface of the flange.

The retaining member may be referred to as retaining means.

In another embodiment, the retaining means may comprise a planar portion and a tongue that projects away from the planar portion. The tongue may be arranged to engage with a corresponding socket in the flange, when the shaft is received within the hole in the retaining means. Engagement of the tongue and socket may substantially prevent relative rotation of the shaft and retaining means, about the axis of the shaft. The tongue may hold the shaft in precisely one orientation with respect to the retaining means. The tongue and socket may have corresponding profiles. The tongue and socket may engage in a close fit. The tongue may be formed by pressing out a portion of the retaining means. The tongue may be formed by cutting a profile (for instance a partial rectangular profile) in the retaining means and folding the part inside the profile out of the plane of the retaining means. Such an arrangement obviates the need for welding, riveting or gluing the retaining means to a shaft, and enables a much simpler method of manufacture and product assembly.

The retaining means and the shaft may be manufactured from stainless steel. The retaining means and the shaft may be manufactured from carbon steel and electroplated to prevent corrosion.

The retaining means may be a retaining member. The retaining means may be an arm. The arm may be of any shape or profile; however, in a preferred embodiment the retaining means is a substantially flat arm. The flat arm may have a thickness of 1.2 mm. The flat arm may be configured to have a thickness in the direction of the axis of the shaft significantly smaller than its dimensions radially from the axis of the shaft. The arm may be sized and/or configured for cutting into thermal insulation (e.g. polystyrene) behind plasterboard, such as by having sharp edges.

The fixing device's operation is not impaired by the presence of a vapour barrier plastic sheeting, or fibrous or semi-rigid insulation in the cavity walls. The flat nature of the arms permits deployment to engage in a narrow cavity less than 1.6 mm wide, and permits the cutting of its own recess in plasterboard, if necessary.

The arm may have a surface area, for contact with a planar surface, of between approximately a third of the axial cross-sectional area of the body of the fixing device and approximately equal to the cross-sectional area of the body of the fixing device. The arm may have a surface area, for contact with a planar surface, approximately a half of the cross-sectional area of the body of the fixing device.

The arm may have a surface area for contact with a planar surface of between 40 mm² and 500 mm², and a thickness of between 0.8 mm and 1.2 mm.

The fixing device may further be provided with a cap that covers the shaft, to prevent tampering therewith after the fixing device has been secured into a structure. The cap may be receivable within the anchor receiving aperture.

The body may have only one passage. Alternatively, the body may have more than one passage and the fixing device may have: a shaft provided within each or only some of the passages. The shafts may be rotatably movable, independent of axial movement, within their respective passages. The retaining means may be coupled to each shaft and may be configured to be movable between a respective extended position, in which the device is retainable in a hole, and a respective retracted position, in which the fixing device is removably insertable into said hole.

The plurality of passages may be disposed substantially rotationally symmetrically about the anchor receiving aperture, and each passage may have a respective passage axis that is arranged to be parallel to the aperture axis.

The or each shaft may be rotatably movable, independent of axial movement, within the respective passage.

Each retaining means may be a substantially flat arm having a surface area, for contact with a planar surface, equal to that of each other arm, and the total surface area, for contact with a flat surface, of all the arms may be approximately equal to the cross-sectional area of the body of the fixing device.

Each retaining means may be a substantially flat arm, and one arm may have a surface area, for contact with a planar surface, different to that of another arm, and the total surface area, for contact with a flat surface, of all the arms may be greater than the cross-sectional area of the body of the fixing device. Thus, in the retracted position, the substantially flat arms may overlap one another, but in the extended position, the fixing device may be secured more effectively, by spreading any applied load over a larger surface area than if both arms had the same surface area. Furthermore, one of the substantially flat arms may be further configured to be movable into and out of a plane coincident with another of the substantially flat arms. That is, one of the flat arms may lie substantially in a first plane, and another of the flat arms may be movable between a first location, in which it lies substantially in the first plane, and a second location, in which it lies substantially in a second plane, parallel to the first plane. In this way, the fixing device may be secured evenly, so as to prevent a load exerting a twisting force on the fixing device. For instance, in order to secure the device in a hole in a wall, the first shaft may be rotated in order to move the first flat arm from its retracted position into its extended position, then the second shaft may be moved axially to move the second flat arm into the same plane as the first flat arm, and finally the second shaft may be rotated to move the second flat arm from its retracted position into its extended position. Similarly, in order to remove the device from the hole in the wall, the reverse operation may be performed, i.e. the second shaft may be rotated to move the second flat arm from its extended position into its retracted position, the second shaft may then be moved axially to move the second flat arm out of the plane of the first flat arm, and finally the first shaft may be rotated in order to move the first flat arm from its extended position into its retracted position.

If there is more than one passage, then each one may be provided symmetrically around the body. In this way, the fixing device may be secured, in use, evenly about an axis defined by the anchor receiving aperture. However, the shafts may be provided in other configurations to suit specific needs, such as when the fixing device is in a corner or against another object, which may prevent the arms being rotated at least at one point. Each respective retaining means may have a surface area for contact with a flat surface substantially equal to the cross-sectional area of the body of the fixing device divided by the number of respective retaining means. The fixing device may further comprise a stop, for maintaining the retaining means in an optimal extended position. In this way, optimal securing of the fixing device may be achieved without an operator of the fixing device having to apply a judgment as to how much to move the retaining means in order to secure the fixing device. The optimal extended position may be the position in which maximum securing is provided by the locking arm. The stop may be a projection. The projection may be integrally formed with the body. The stop may have a diameter of between 1.3 mm and 2 mm. The stop may have a diameter of approximately 1.3 mm, 1.5 mm or 1.2 mm. The stop may have a depth of 1 mm. The stop may be located adjacent the circumferential edge of the rear of the body.

The fixing device may further comprise anti-rotation means/part for preventing rotation of the fixing device about an axis parallel to that of the anchor receiving aperture. In this way, insertion of an anchor into the anchor receiving aperture may be made easier, in that the fixing device may not rotate as an anchor is rotatably driven therein. The anti-rotation means may be anti-rotation apparatus. The anti-rotation means may comprise any number of wings parallel to the anchor axis. For instance, the anti-rotation means may be a single wing parallel to the axis of the anchor receiving aperture. The anti-rotation means may be a pair of wings parallel to the axis of the anchor receiving aperture, and located diametrically opposite one another. The wings may extend radially away from the outer surface of the body to thus create friction with the surface of the structure into which the device is placed so as to prohibit or, at least reduce, rotation of the device relative to the structure. The wings may cut into the structure around the hole on insertion of the fixing device into that hole. The wings may extend radially away from the outer surface of the body a distance of approximately 3 mm. The wings may have a thickness of between 1 mm and 1.5 mm. The wings may have a thickness of approximately 1 mm, 1.2 mm or 1.5 mm. The wings may have a depth equal to the depth of the body.

The over-insertion stops may be formed with the anti-rotation parts.

The fixing device may further comprise a cap that covers the shaft(s), to prevent tampering with the shaft(s) after the fixing device has been secured to a structure. The cap may be secured with an anchor into the anchor receiving aperture.

According to one embodiment of the invention, the fixing device may be assembled by: providing a body having an anchor receiving aperture and a passage that extends within the body, spaced from the anchor receiving aperture, and a shaft having an enlarged head; inserting the shaft through the passage; and coupling a retaining means to the shaft.

According to one embodiment of the invention, the fixing device may be assembled by: providing a body having an anchor receiving aperture and a passage that extends within the body, spaced from the anchor receiving aperture, and a shaft having a circumferential groove; coupling a retaining means to the shaft; inserting the shafts through the passage; and providing a circlip on the circumferential groove.

According to one embodiment of the invention, the fixing device may be assembled by: providing a body having an anchor receiving aperture and a passage that extends within the body, spaced from the anchor receiving aperture, and a shaft having an enlarged head; coupling a retaining means to the shaft; and inserting the shafts into the passage radially through an open side thereof.

According to a second aspect of the present invention, there is provided a fixing system including the fixing device of the first aspect, the fixing system for securing the fixing device into a hole in plasterboard, wherein: the anchor receiving aperture of the body has an aperture axis; the body comprises: a plurality of passages, each extending within the body, spaced from the anchor receiving aperture; a respective shaft provided within each passage, each shaft being rotatably movable within the respective passage; and a respective retaining member coupled to each shaft, each retaining member configured to be pivotally movable about the respective shaft between an extended position, in which the fixing device is retainable in said hole, and a retracted position, in which the fixing device is removably insertable into said hole; and the fixing system comprises an activation tool, comprising an activation member arrangable such that rotation of the activation tool about an activation axis causes each retaining member to move from the retracted position to the extended position substantially simultaneously.

In this way, uneven gripping and/or slippage of the fixing device can be avoided by reducing the steps taken to secure the device.

The fixing device may be operated, once it has been inserted into a hole in a structure, by moving the retaining members to the extended position. For instance, a hole may be drilled in a plasterboard structure for insertion of the fixing device axially therein. The fixing device may be inserted into the hole from the front face of the plasterboard, such that the retaining members are behind the rear face of the plasterboard. Rotating the activation tool causes the retaining members to move from their retracted position (i.e. their ambush position, in which they sit within the axial profile of the body) to their extended position (in which they project radially away from the body). In the extended position, the retaining members therefore substantially inhibit movement of the fixing device through the hole in the plasterboard, thus preventing removal of the fixing device from the front face of the structure. If the fixing device is recessed within the hole (either by over-insertion or if the body has a depth less than the thickness of plasterboard), then the retaining members can be drawn tight against the rear face of the plasterboard by fixing a plate (which could be, for instance, part of a hook or bracket for attachment to the plasterboard) to the front face with an anchor, received within the anchor receiving aperture. Specifically, the anchor may draw the plate and the fixing device toward each other, thereby drawing the retaining members tight against the rear face, and drawing the plate tight against the front face.

In particular, the activation member may be arrangable such that rotation of the activation tool about the activation axis causes the activation member to contact each retaining member to push each retaining member from the retracted position to the extended position.

The activation member may be a rod, a plate and/or substantially flat. The activation member may comprise a substantially rectangular shape. The activation member may be stainless steel, and may be coloured to match a fixing device with which it is to be used.

The activation tool may further comprise a shaft connected to the activation member, the shaft configured to be removably insertable into the anchor receiving aperture.

The body may further comprise a slot therein, the slot arranged within the body so as to include the aperture axis, and the slot configured such that the activation member is removably insertable therethrough. In this way, the shaft and activation member may be inserted together through the aperture and slot, respectively. The shaft may be of a sufficient length for the activation member to pass through the slot and out of a rear side of the body from the front side. In this way, the activation member may be rotatable on the rear side of the body, when a user rotates the shaft on the front side of the body.

The activation tool may further comprise a stop located on the shaft, and the stop may be arranged such that a distance along the shaft between the stop and the activation member is substantially equal to a thickness of the body along the aperture axis. In this way, over-insertion of the shaft into the body may be prevented. The stop may be in the form of a handle for manual manipulation of the tool.

Alternatively, the activation member may be rotatably coupled to the body, and may comprise a socket for receiving an end of a hand tool therein for rotation of the activation member about the activation axis. For instance, the socket may be a screw-drive, such that a corresponding screw driver may be inserted through the aperture to engage with the activation member. The screw driver may be removed subsequent to actuation of the retaining members, leaving the activation member behind the body.

The activation member may be releasably attachable to the body, for instance frangibly attached, such that actuation by the hand tool causes the activation member to decouple. In such arrangements, actuation of the retaining arms is followed by loss of the activation member into a cavity in the wall/ceiling in which the device is fixed. Alternatively, the activation member may be permanently attached, for instance rotationally attached, such that no loss of the activation member accompanies actuation of the retaining members.

The activation axis may be coaxial with the aperture axis. The radial length of the activation member may be greater than substantially equal to a radial distance of a rotation axis of the retaining member from the aperture axis.

According to a third aspect of the present invention, there is provided a fixing system for securing a fixing device into a hole in plasterboard, the fixing system comprising: a body having an anchor receiving aperture therein, the anchor receiving aperture having an aperture axis; a plurality of passages, each extending within the body, spaced from the anchor receiving aperture; a respective shaft provided within each passage, each shaft being rotatably movable within the passage; a respective retaining member coupled to each shaft, each retaining member configured to be pivotally movable about the respective shaft between an extended position, in which the fixing device is retainable in said hole, and a retracted position, in which the fixing device is removably insertable into said hole; and an activation tool, comprising an activation member arrangable such that rotation of the activation tool about an activation axis causes each retaining member to move from the retracted position to the extended position substantially simultaneously.

According to a fourth aspect of the present invention, there is provided a fixing device for securing into a hole in plasterboard, and for use with an activation tool, the fixing device comprising: a body having an anchor receiving aperture therein, the anchor receiving aperture having an aperture axis; a plurality of passages, each extending within the body, spaced from the anchor receiving aperture; a respective shaft provided within each passage, each shaft being rotatably movable within the passage; a respective retaining member coupled to each shaft, each retaining member configured to be pivotally movable about the respective shaft between an extended position, in which the fixing device is retainable in said hole, and a retracted position, in which the fixing device is removably insertable into said hole; and a slot arranged within the body so as to include the aperture axis, and the slot configured such that the activation member is removably insertable therethrough; wherein the activation tool comprises an activation member arrangable such that rotation of the activation tool about an activation axis causes each retaining member to move from the retracted position to the extended position substantially simultaneously.

According to a fifth aspect of the present invention, there is provided an activation tool for use in a fixing system for securing a fixing device according to the second aspect into a hole in plasterboard, the activation tool comprising: a shaft configured to be removably insertable into the anchor receiving aperture of the fixing device; an activation member connected to the shaft, the activation member configured to removably insertable into the slot of the fixing device, and arrangable such that rotation of the activation tool about an activation axis causes each retaining member of the fixing device to move from the retracted position to the extended position substantially simultaneously.

According to a sixth aspect of the present invention, there is provided a method of securing a fixing device into a hole in plasterboard, the method comprising the steps of: providing a fixing device according to the first aspect; inserting the fixing device into a hole in a surface, such that the retaining members are placed behind a rear face of the surface; and moving the retaining member from their retracted position to their extended position.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

FIG. 14 is a front view of another fixing device incorporating various optional features.

FIG. 15 is a rear view of the fixing device of FIG. 14.

FIG. 16 is a cross-sectional view of the fixing device of FIG. 14.

FIG. 17 is another rear view of the fixing device of FIG. 14.

FIG. 22 is a front view of a component of a yet further fixing device incorporating various optional features.

FIG. 23 is a cross-sectional view of a fixing device incorporating the component of FIG. 22.

FIG. 24 is a rear view of the fixing device of FIG. 23.

FIG. 25 is another rear view of the fixing device of FIG. 23.

FIG. 30 is a front view of a fixing device incorporating various optional features.

FIG. 31 is a cross-sectional view of the fixing device of FIG. 30.

FIG. 32 is a rear view of the fixing device of FIG. 30.

FIG. 33 is another rear view of the fixing device of FIG. 30.

DETAILED DESCRIPTION OF THE INVENTION

Figure 1:
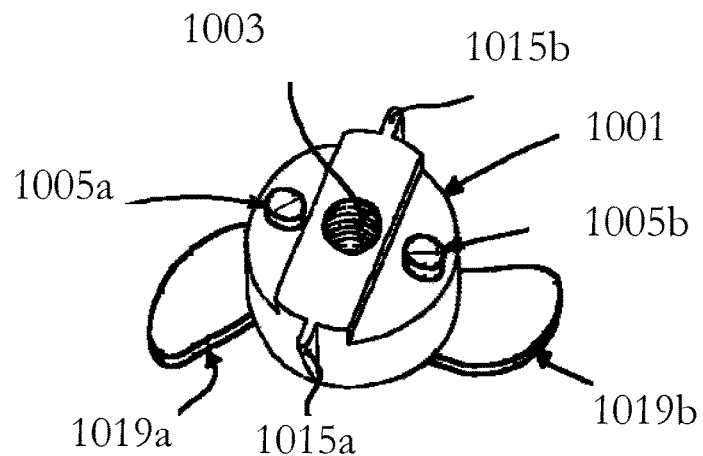
FIG. 1 is a perspective view of a known fixing device.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

FIG. 1 is a perspective view of a known fixing device having a body 1001 of a substantially cylindrical form, with an axial depth of approximately 11.5 mm and a diameter of approximately 20 mm. The body 1001 has an anchor receiving aperture 1003, which passes axially through the body 1001, is internally threaded, and has a diameter of approximately 6.5 mm. The body includes two passages that extend through the body 1001, each passage having an axis parallel to, and spaced from, the axis of the anchor receiving aperture 1003. The two passages are disposed diametrically opposite one another around the body 1001, and set in from the edge of the body 1001. Each passage has an open-sided keyhole-shaped cross-section, and includes a constriction for retaining a 1005a, 1005b within the circular portion of the keyhole shape. Either side of each passage are provided slots 1047a, 1047c and 1047b, 1047d, respectively, each projecting semi-radially inward from the outer surface of the body 1001 and running parallel to the axis of the passages. The body 1001 is also provided with two wings 1015a, 1015b diametrically opposed around the circumference of the body 1001, and offset from the passages.

Figure 2:
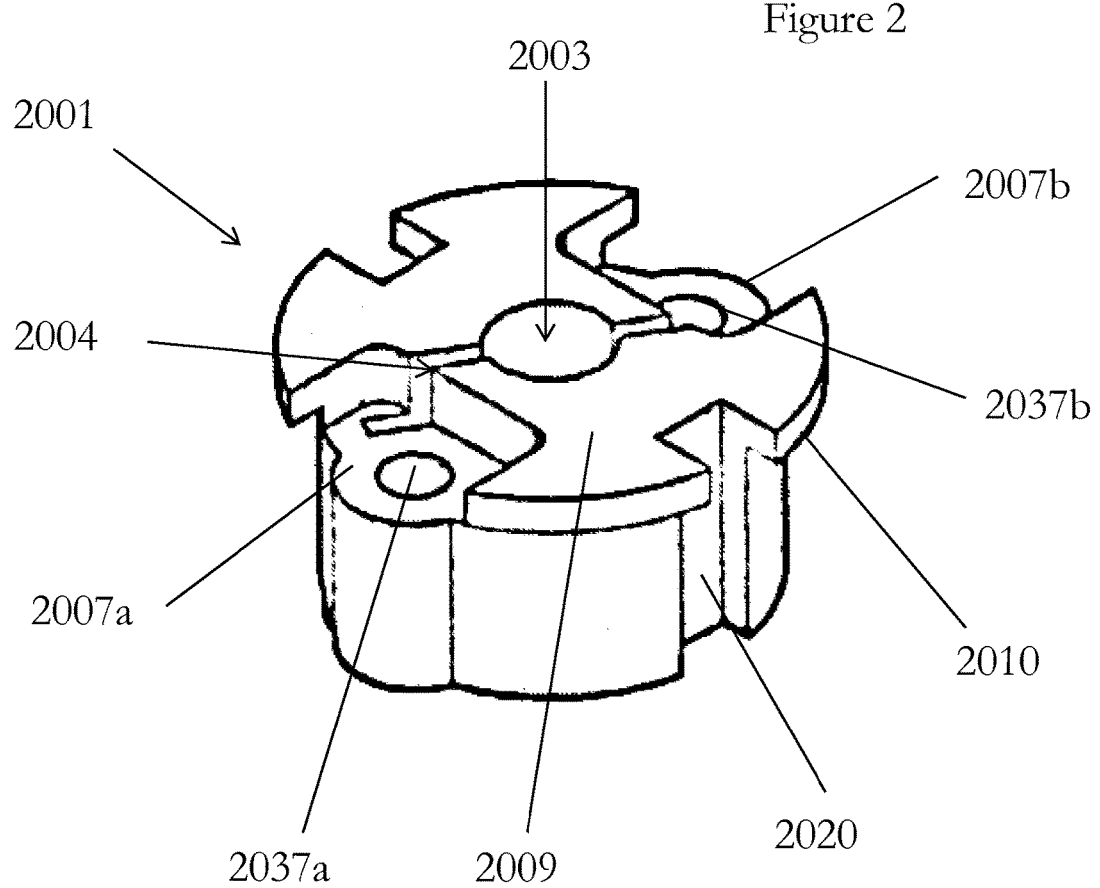
FIG. 2 is a perspective view of a component part of a fixing device according to the invention.

FIG. 2 is a perspective view of a body 2001 of a fixing device according to the invention, having a substantially cylindrical form. The body 2001 is provided with an anchor receiving aperture 2003 centrally located therein, and a slot 2004 located across a diameter of the aperture 2003 and extending into the body 2001 in diametrically opposite directions. The slot 2004 is of uniform width (although a variable width is also possible) and extends through the entire depth of the body 2001 (i.e. axially from one substantially cylindrical face to another). The body 2001 is also provided with two passages 2037a, 2037b that extend through the body 2001, each passage having an axis parallel to, and spaced from, the axis of the anchor receiving aperture 2003. The passages 2037a, 2037b are disposed diametrically opposite one another around the body 2001, are set in from the edge of the body 2001, are offset from the slot 2004 and are substantially circular in cross-section. The passages 2037a, 2037b are disposed within respective recesses 2007a, 2007b in a surface 2009 of the body 2001. The recesses 2007a, 2007b are substantially rectangular in form and are of uniform depth. The portion of the surface 2009 remaining forms an approximately H-shaped guide rail. A peripheral flange 2010 runs around a perimeter of the surface 2009, and is split into four sections by the recesses 2007a, 2007b and vertical grooves 2020.

Figure 3:
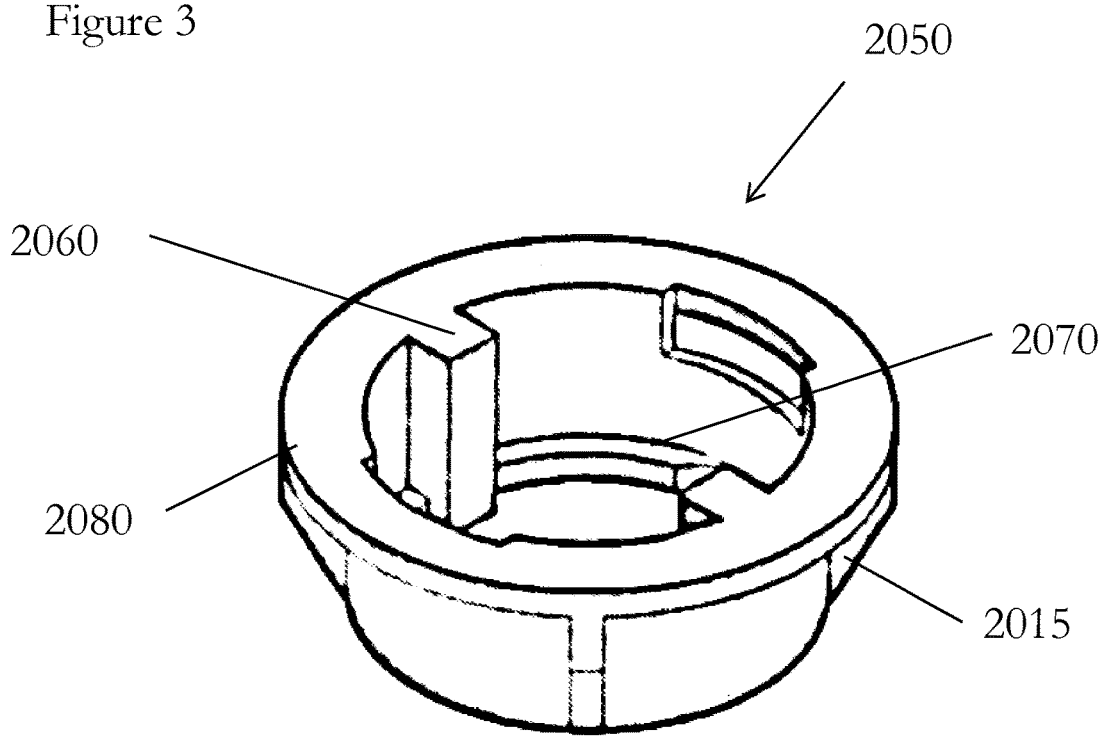
FIG. 3 is a perspective view of a further component part of the fixing device of FIG. 2.

FIG. 3 is a perspective view of a collar 2050 for use with the body 2001. The collar 2050 is configured to receive the body 2001 snugly therein, such that rails 2060 engage with the grooves 2020. An internal flange 2070 is shown which prevents passage of the body 2001 all the way through the collar 2050 when inserted from the top.

The collar 2050 is also provided with four wings 2015 for preventing rotation of the fixing device about the axis of the anchor receiving aperture 2003. The wings 2015 are substantially trapezoidal and project radially outward from the surface of the collar 2050, parallel to the axis of the body 2050. The wings 2015 are spaced equally around the exterior surface collar 2050, offset by 45 degrees from the passages 2037a, 2037b.

Along the top of the wings 2015 is provided an over-insertion stop 2080 in the form of an exterior flange on the collar.

Figure 4:
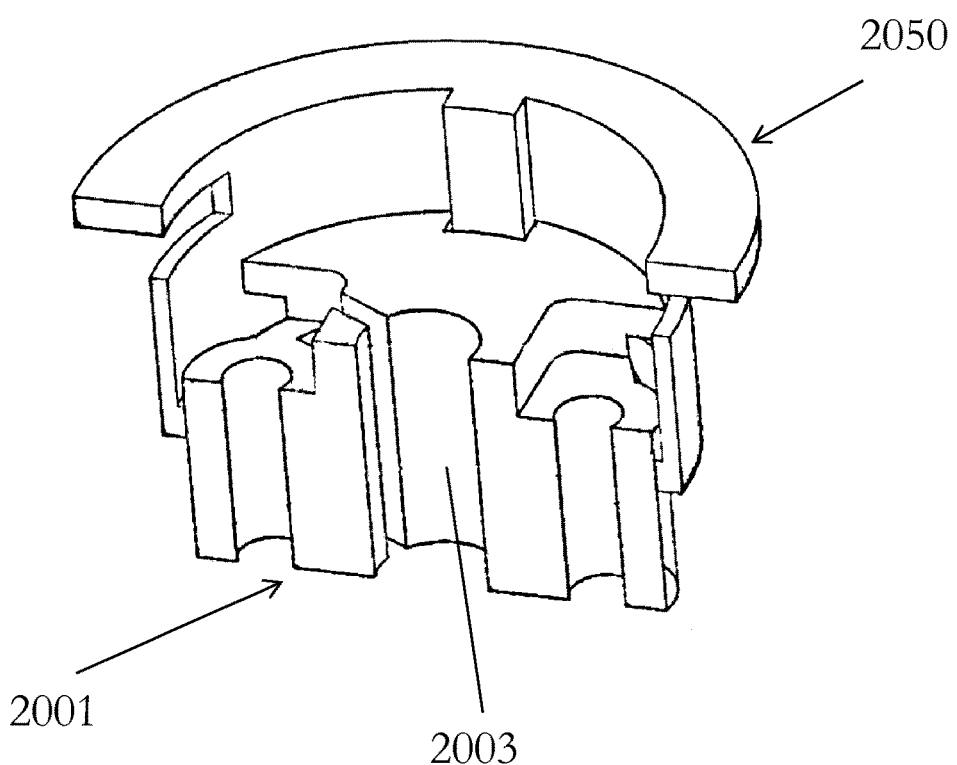
FIG. 4 is a cross-sectional view of a partially assembled fixing device of FIGS. 2 and 3.

FIG. 4 is a cross-sectional view showing the body 2001 inserted fully into the collar 2050; other parts of the fixing device such as the shaft and retaining members are not shown for clarity.

Figure 5:
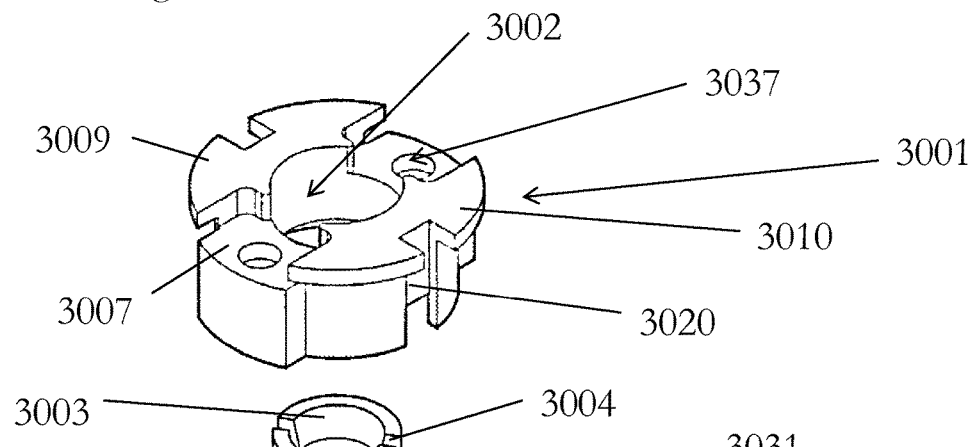
FIG. 5 is an exploded perspective view of a further fixing device according to the invention.

FIG. 5 is an exploded perspective view of a further fixing device according to the invention including a body 3001, collar 3050, retaining members 3019, and an activation member 3031; other parts of the fixing device such as the shaft are not shown for clarity. The body comprises a surface 3009, passages 3037 in recesses 3007, a peripheral flange 3010, and vertical grooves 3020 substantially the same as in the arrangement shown in FIG. 2. The central hole 3002 is of a larger diameter than the anchor receiving aperture 2003, as it is configured to accommodate the activation member 3031 therein. The activation member 3031 includes the anchor receiving aperture 3003 and the slot 3004, as well as a bar 3080 disposed on a lower flange 3090.

The collar 3050 includes the same features of rails 3060, an internal flange 3070, wings 3015 and over-insertion stop 3080; however, in this arrangement, the over-insertion stop 3080 is split into four portions, each capping the top of one of the wings 3015.

When the slot 3004 is engaged with a tool (for instance a flat head screw driver), the whole of the activation member 3031 may be rotated, such that the bar 3080 rotates, pushing the retaining members 3019 out from their retracted position to their deployed position. Axial motion of the activation member 3031 is prevented by the flange 3090 preventing passage up through the hole 3002, and is prevented by the retaining members 3019 preventing passage down through the hole 3002.

Figure 6:
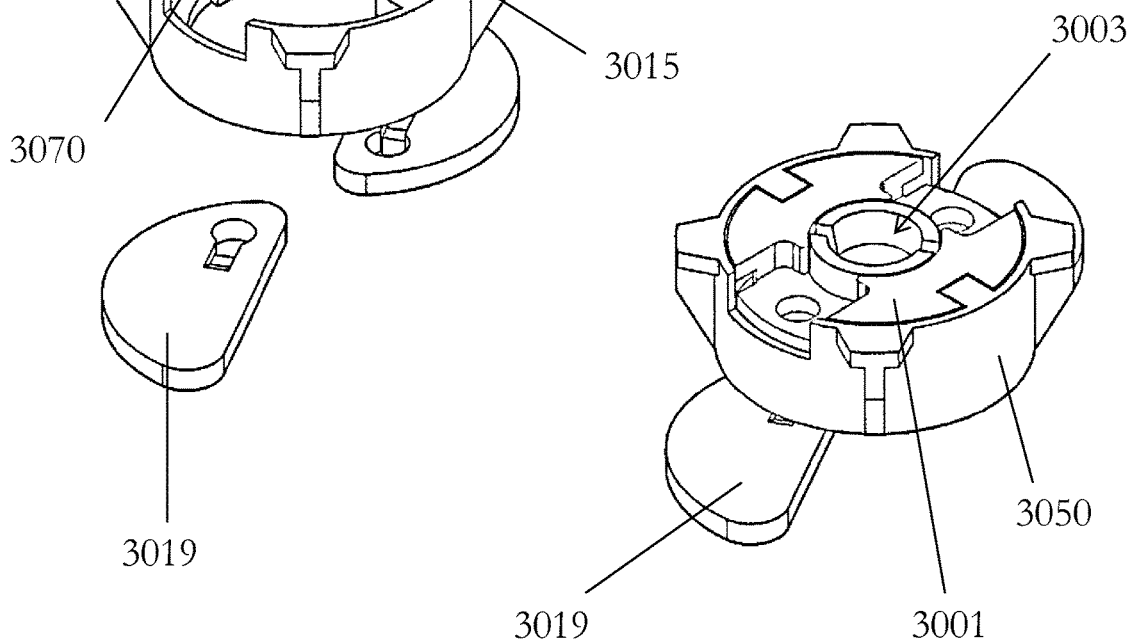
FIG. 6 is a perspective view of the fixing device of FIG. 5 in an assembled state.

FIG. 6 is a perspective view of the fixing device of FIG. 5 in an assembled state, with the body 3001 in a fully retracted position within the collar 3050.

Figure 7:
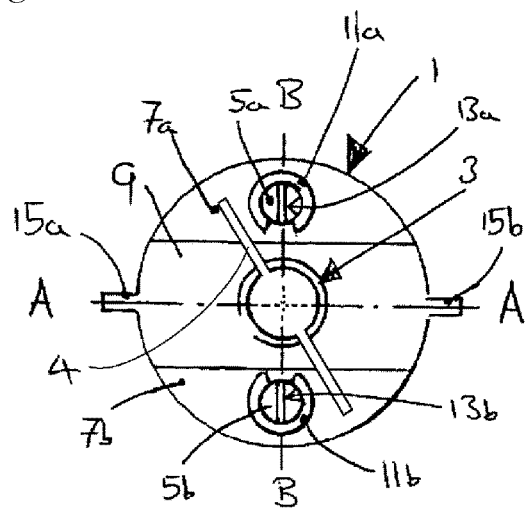
FIG. 7 is a front view of a fixing device incorporating various optional features.

FIG. 7 shows a fixing device, comprising a body 1 of a substantially cylindrical form, having an axial depth of approximately 11.5 mm and a diameter of approximately 20 mm. The body includes an anchor receiving aperture 3, which passes axially through the body, is internally threaded, and has a diameter of approximately 6.5 mm. A slot 4 is located across a diameter of the aperture 3, and extends into the body 1 in diametrically opposite directions. The slot 4 is of uniform width (although a variable width is also possible) and extends through the entire depth of the body (i.e. axially from one substantially cylindrical face to another). The body also includes shafts 5a, 5b, of a substantially rod-like shape, further described with reference to FIG. 6, below. The shafts 5a, 5b are provided within respective passages 37a, 37b (not shown in FIG. 1), which extend through the body 1, each passage having an axis parallel to, and spaced from, the axis of the anchor receiving aperture 3. The passages 37a, 37b are disposed diametrically opposite one another around the body 1, set in from the edge of the body 1, and are substantially circular in cross-section. The passages 37a, 37b are internally smooth. The passages 37a, 37b are disposed within respective recesses 7a, 7b in a surface 9 of the body 1. The recesses 7a, 7b are in the form of circular segments in the surface 9, of uniform depth, with their respective chords being parallel to one another. The portion of the surface 9 remaining forms an approximately rectangular shaped guide rail. Spring-clips 11a, 11b (shown in detail in FIG. 7) are provided around the shafts 5a, 5b, respectively, to limit axial movement of the shafts 5a, 5b. The spring-clips 11a, 11b are provided on respective circumferential grooves 39a, 39b (not shown in this figure) about one end of each shaft 5a, 5b, which limit axial movement of each shaft 5a, 5b within the passages 37a, 37b. The shafts 5a, 5b have respective slot screw drives 13a, 13b, in respective ends, for receiving a slot screw driver for rotating the shafts 5a, 5b. The body 1 is also provided with wings 15a, 15b for preventing rotation of the body 1 about the axis of the anchor receiving aperture 3. The wings 15a, 15b are substantially trapezoidal and project radially outward from the surface of the body 1, parallel to the axis of the body 1. The wings 15a, 15b are disposed diametrically opposite one another around the exterior surface body 1, offset by 90 degrees from the passages 37a, 37b.

Figure 8:
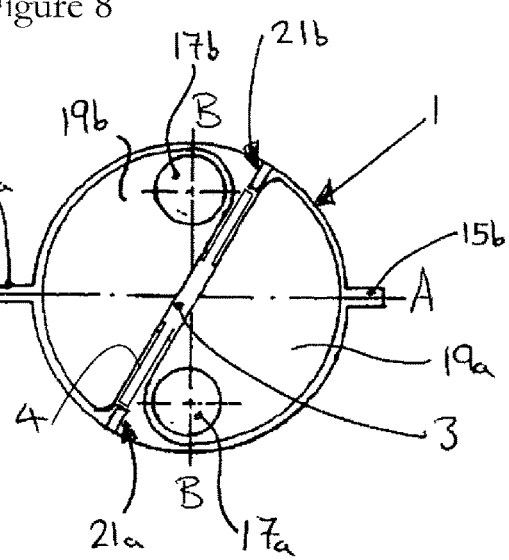
FIG. 8 is a rear view of the fixing device of FIG. 7.

FIG. 8 shows the fixing device of FIG. 7 from the reverse side. Flanges 17a, 17b, in the form of circular discs coupled to the end of the shafts 5a, 5b opposing the screw drives, are welded to respective arms 19a, 19b, which are shown in the retracted position in which they sit within the axial profile of the body. The arms 19a, 19b are flat plates of a substantially semi-circular profile, in one corner of each is a hole through which the respective shaft 5a, 5b is passed such that the respective flange 17a, 17b abuts the side of the arm 19a, 19b opposite the distal end of the shaft 5a, 5b. Rotation of a shaft 5a, 5b causes rotational movement of the respective arm 19a, 19b in the plane of FIG. 2, which is limited by a respective stop 21a, 21b in the clockwise direction and another respective stop 21b, 21a in the anti-clockwise direction. The stops 21a, 21b are integrally formed with the body 1, and project beyond the rear circular face of the body, into the plane occupied by the arms 19a, 19b.

Figure 9:
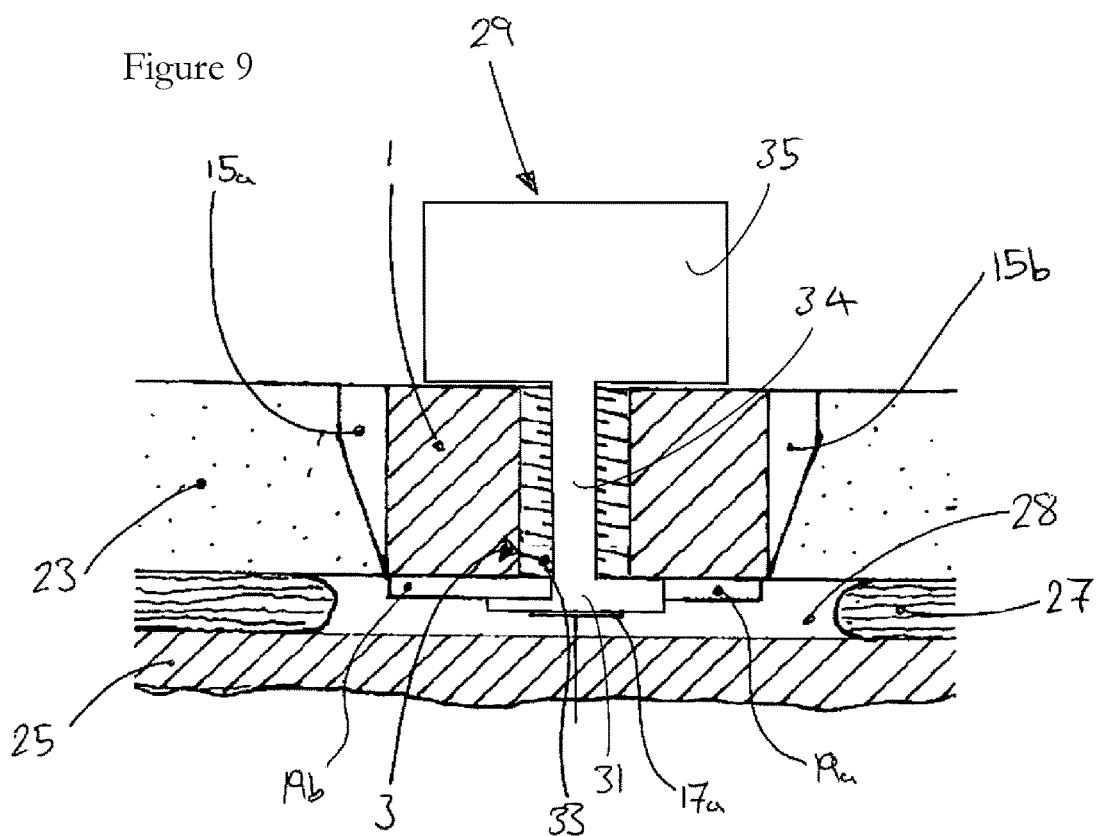
FIG. 9 is a cross-sectional view of the fixing device of FIG. 7.

FIG. 9 shows a cross-section of the fixing device along line A-A of FIGS. 7 and 8, when inserted into a wall. The arms 19a, 19b are shown in their retracted position. The wings 15a, 15b have cut into plasterboard 23, which is bonded to masonry wall 25 with adhesive 27, to form a cavity 28. The cavity 28 may vary in thickness between 10 mm and 25 mm, depending on the thickness of the adhesive 27 at the time the plasterboard 23 was placed in position against the wall 25. An activation tool 29 is shown inserted into the aperture 3 and slot 4. Aperture 3 is shown with an internal screw thread 33. The activation tool 29 comprises an activation member 31, which is passed through the slot 4 (and out the other side), a shaft 34, which is passed into the aperture 3, and a handle 35 for manipulation by a user. The length of the shaft 34 is substantially equal to the thickness of the body 1, and the handle 35 has a lateral extent (for instance, a diameter in embodiments where it is substantially cylindrical) greater than the diameter of the aperture 3. In this way, the tool 29 cannot be over inserted and, when inserted fully, the activation member 31 is correctly located to engage with the arms 19a, 19b.

Figure 10:
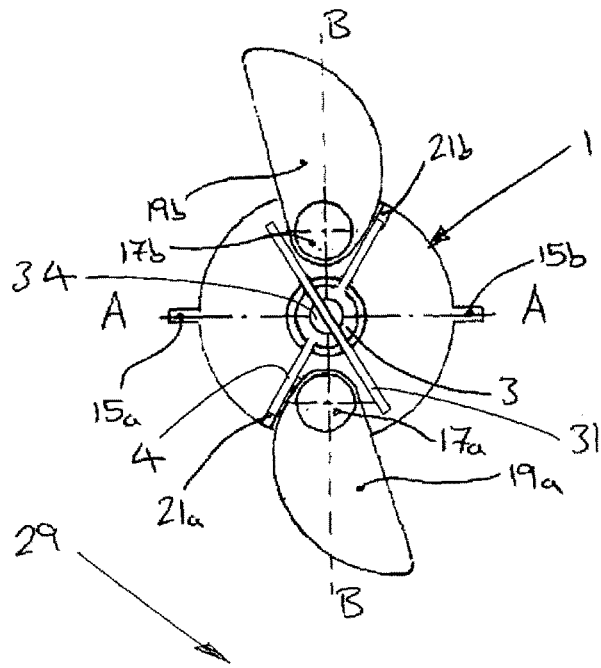
FIG. 10 is another rear view of the fixing device of FIG. 7.

FIG. 10 shows the same view of the fixing device as FIG. 8, but with the arms 19a, 19b having been pushed into the optimal extended position by the activation tool 29 (indicated in the figure). Thus, the arms 19a, 19b project radially away from the body 1, in order to maximise a surface area for contact with the rear of the plasterboard 23, and abut stops 21a, 21b respectively.

Figure 11:
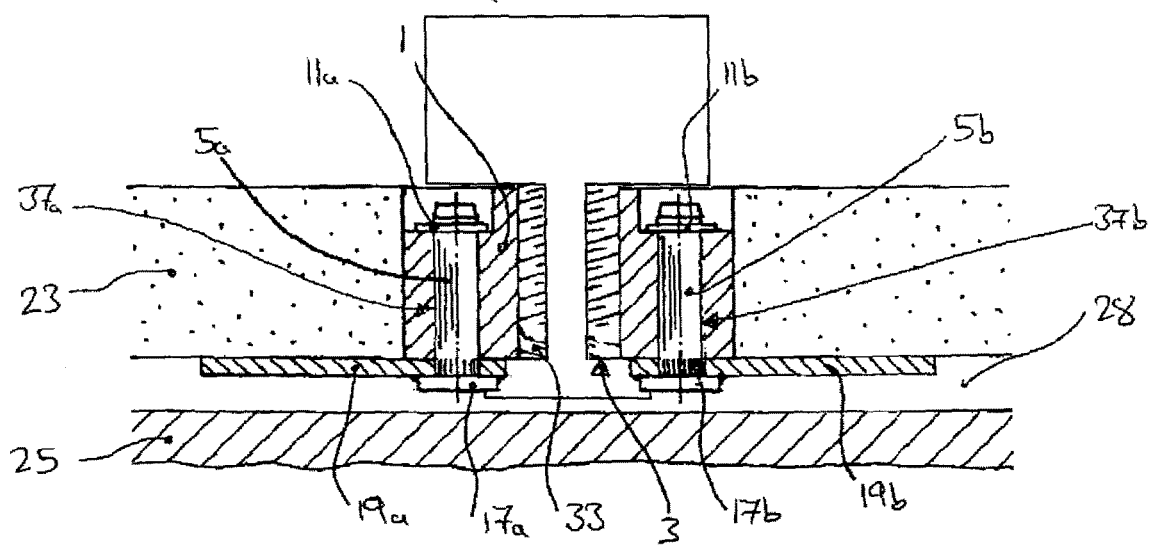
FIG. 11 is another cross-sectional view of the fixing device of FIG. 7.

FIG. 11 shows a cross-section of the fixing device along line B-B of FIG. 4, when inserted into a wall. The arms 19a, 19b are in their extended position. Shaft 5a is provided within passage 37a. The shaft 5a in knurled adjacent the flange 17a to improve contact with the arm 19a.

Figure 12:
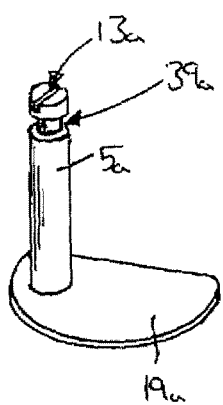
FIG. 12 is a perspective view of a component of the fixing device of FIG. 7.

FIG. 12 shows a perspective view of an actuation member in accordance with the fixing device shown in FIGS. 7 to 11 that comprises the shaft 5a, having a circumferential groove 39a for receiving the spring-clip 11a and the slot screw drive 13a, and the arm 19a coupled thereto, as described above.

The shafts 5a, 5b can be individually rotated, using the slot screw drives 13a, 13b, in order to move their respective arm 19a, 19b between the retracted position and the extended position.

Figure 13:
FIG. 13 is an axial view of another component of the fixing device of FIG. 7.

FIG. 13 shows the spring-clip 11a in accordance with the fixing device shown in FIGS. 7 to 12.

FIG. 14 shows another fixing device, comprising a body 101, similar to the body 1 of FIG. 7, and an anchor receiving aperture 103, substantially the same as the anchor receiving aperture 3. However, three slots 104 are provided tangentially to the aperture 103. Although radial arrangement of the slots 104 is preferred, the tangential arrangement is shown as an example of an alternative; further intermediate arrangements are also considered useful in some embodiments. The fixing device comprises three shafts 105a, 105b, 105c, each substantially the same as the shafts 5a, 5b, provided within respective passages 137a, 137b, 137c, each substantially the same as the passages 37a, 37b, and disposed rotationally symmetrically around the axis of the body 101. The passages 137a, 137b, 137c are disposed within respective recesses 107a, 107b, 107c in a surface 109 of the body 1. The recesses 107a, 107b, 107c are in the form of a rectangular hollow in the surface 9, of uniform depth, each centred on its respective passage 137a, 137b, 137c. Spring-clips 111a, 111b, 111c, substantially identical to the spring-clips 11a, 11b, are provided around the shafts 105a, 105b, 105c to limit axial movement of the shafts 105a, 105b, 105c. The shafts 105a, 105b, 105c each have slot screw drives 113a, 113b, 113c respectively, substantially the same as the slot screw drives 13a, 13b. The body 101 is also provided with three wings 115a, 115b, 115c, substantially the same as the wings 15a, 15b, for preventing rotation of the body 101 about the axis of the anchor receiving aperture 103. The wings 115a, 115b, 115c are disposed symmetrically around the exterior surface of the body 101, offset from the passages 137a, 137b, 137c.

FIG. 15 shows the fixing device of FIG. 14 from the reverse side. Flanges 117a, 117b, 117c, substantially the same as the flanges 17a, 17b, provided on each of the shaft 105a, 105b, 105c are welded to the arms 119a, 119b, 119c, respectively, which are shown in the retracted position. Rotational movement of one arm 119a in the plane of FIG. 15 is limited by a stop 121a in the clockwise direction and another arm 119b in the anti-clockwise direction. The same limits on rotational movement of the other arms 119b, 199c apply mutatis mutandis.

FIG. 16 shows a cross-section of the fixing device along line C-C of FIGS. 14 and 15, when inserted into a wall, and with a tool 129 in place therein, the tool 129 having three arms for use in the three slots 104, but being otherwise similar to the tool 29. The arms 119a, 119b, 119c are in their extended position. The wings 115a, 115b, 115c have cut into plasterboard 123, which is bonded to masonry wall 125 with adhesive 127, to form a cavity 128. The cavity 128 may vary in thickness between 10 mm and 25 mm, depending on the thickness of the adhesive 127 at the time the plasterboard 123 was placed in position against the wall 125. The shaft 105a is provided within passage 137a and has a circumferential groove 139a provided with spring-clip 111a, which limits axial movement of the shaft 105a within the passage 137a.

FIG. 17 shows the same view of the fixing device as FIG. 15, but with the arms 119a, 119b, 119c shown having been pushed into the optimal extended position, abutting their respective stops 121a, 121b, 121c, by the tool 129.

Figure 18:
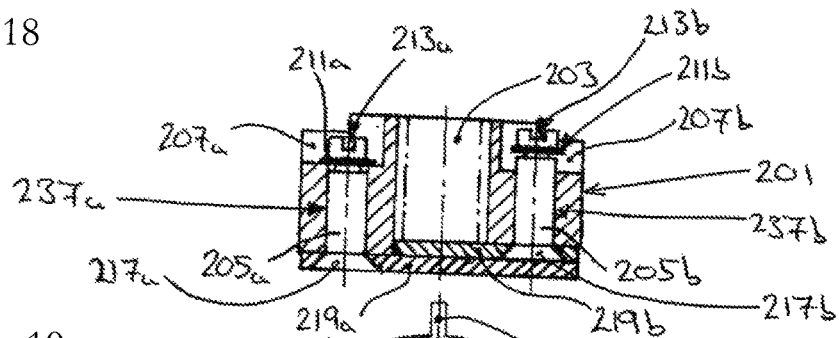
FIG. 18 is a cross-sectional view of a still further fixing device incorporating various optional features.

FIG. 18 shows a cross-section of a fixing device. The body 201 is substantially cylindrical in form, having an axial depth of approximately 11.5 mm and a diameter of approximately 20 mm, and has an anchor receiving aperture 203, similar to the anchor receiving aperture 3 but with a diameter of approximately 4.5 mm, and two passages 237a, 237b, substantially the same as the passages 37a, 37b. The two passages 237a, 237b are disposed diametrically opposite one another around the body 201, set in from the edge of the body 201 and are provided within respective recesses in the top surface 9. The recesses 207a, 207b are each centred on their respective passage 237a, 237b, and each comprises a central sub recess and an extended top recess. Each central sub recess is in the form of a rectangular hollow in the surface 9, of uniform depth. Each extended top recess is in the form of circular segment in the surface 9, of uniform depth less than the depth of the central sub recess, with their respective chords being parallel to one another. The portion of the surface 9 remaining forms an approximately 'H' shaped guide rail. Disposed within each passage 237a, 237b is a respective shaft 205a, 205b, substantially the same as the shafts 5a, 5b, each having a circumferential groove (not shown), provided with a spring-clip 211a, 211b. At the top of each shaft 205a, 205b is a respective slot screw drive 213a, 213b, substantially the same as the screw drives 13a, 13b, and at the bottom of each shaft is a respective flange 217a, 217b in the form of a countersunk head (i.e. a conical portion, flaring out from the main portion of the shaft 205a, 205b). Each flange 217a, 217b is coupled to a respective arm 219a, 219b, which are shown in their retracted position in which they sit within the axial profile of the body 201. The arms 219a, 219b are flat plates, a first plate 219a of which has a substantially circular profile, a second plate 219b or which has a substantially semi-circular profile. On a circumferential edge of each plate 219a, 219b is a hole through which the respective shaft 205a, 205b is passed such that the respective flange 17a, 17b abuts the side of the arm 19a, 19b opposite the distal end of the shaft 5a, 5b. The hole in each plate is a corresponding countersink (i.e. a conical hole arrangement) at one end of each hole. The combination of the arm 219a and the spring-clip 211a substantially prevents any axial movement of the shaft 205a within the passage 237a. In contrast, the combination of the arm 219b and the spring-clip 211b substantially limits axial movement of the shaft 205b within the passage 237b to a distance equal to the thickness of the arms 219a, 219b; that is, around 1.2 mm. Thus, the second arm 219b can therefore be moved into and out of the plane of the first arm 219a, once the first arm has been moved into its extended position. The arm 219a has a larger surface area than the arm 219b.

Figure 19:
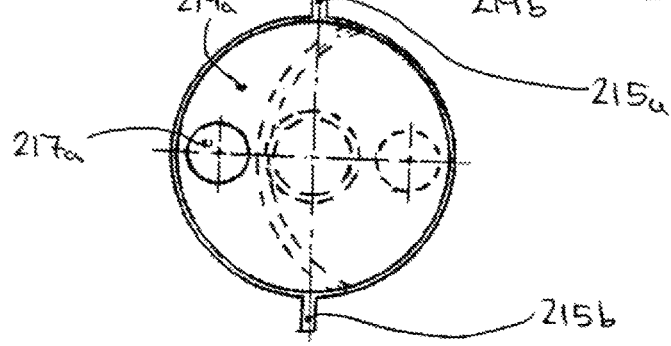
FIG. 19 is rear view of the fixing device of FIG. 18.

FIG. 19 shows an underside view of the fixing device of FIG. 18, which has wings 215a, 215b, substantially the same as the wings 15a, 15b, provided on the body 201.

Figure 20:
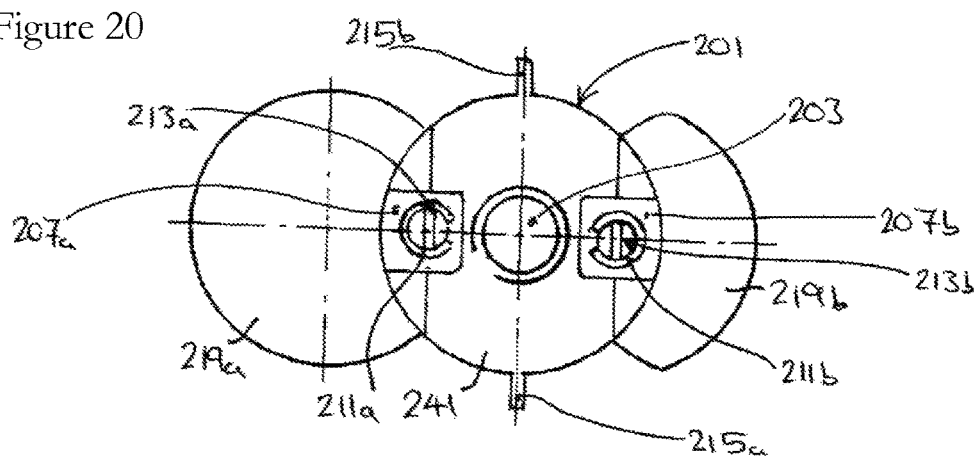
FIG. 20 is a front view of the fixing device of FIG. 18.

FIG. 20 shows a top view of the fixing device of FIGS. 18 and 19, in which the arms 219a, 219b are located in the extended position. The recesses 207a, 207b are shaped to form a guide rail 241 in the top surface of the body 201, to assist the automatic orientation of the body during automatic assembly of the fixing device.

Figure 21:
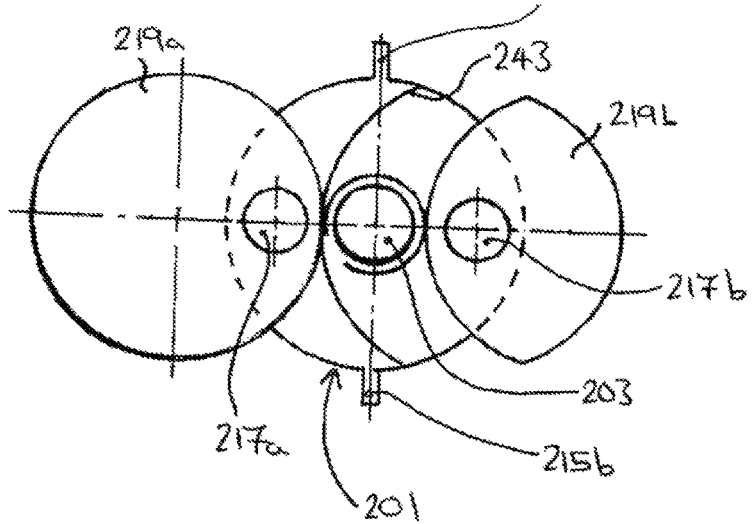
FIG. 21 is another rear view of the fixing device of FIG. 18.

FIG. 21 shows the same view of the fixing device as FIG. 19, but with the arms 219a, 219b in the optimal extended position. A hollow 243 is provided in the rear surface of the body 201 for accommodating the second arm 219b when both arms 219a, 219b are in the retracted position. The first shaft 205a can be rotated in order to move the first arm 219a from its retracted position into its extended position, then the second shaft 205b can be moved axially to move the second arm 219b into the same plane as the first arm 219a, and finally the second shaft 205b can be rotated to move the second arm 219b from its retracted position into its extended position. Similarly, the second shaft 205b can be rotated to move the second arm 219b from its extended position into its retracted position, the second shaft 205b can then be moved axially to move the second arm 219b out of the plane of the first arm 219a, and finally the first shaft 205a can be rotated in order to move the first arm 219b from its extended position into its retracted position.

FIG. 22 shows a body 301 of a fixing device. The body 301 is of a substantially cylindrical form, having an axial depth of approximately 11.5 mm and a diameter of approximately 20 mm. The body 301 has an anchor receiving aperture 303, which passes axially through the body 301, is internally threaded, and has a diameter of approximately 6.5 mm. The body includes a slot 304 similar to the slot 4; however, the slot 304 is substantially wider, and therefore can accommodate a more robust and/or stronger tool (not shown). The body 301 also includes two passages 337a, 337b that extend through the body 301, each passage 337a, 337b having an axis parallel to, and spaced from, the axis of the anchor receiving aperture 303. The two passages 337a, 337b are disposed diametrically opposite one another around the body 301, set in from the edge of the body 301, and are provided within respective recesses 307a, 307b, substantially the same as recesses 7a, 7b, in the top surface. Each passage 337a, 337b has an open-sided keyhole-shaped cross-section, and includes a constriction 345a, 345b for retaining a shaft within the circular portion of the keyhole shape. Either side of each passage 337a, 337b are provided two slots 347a, 347c and 347b, 347d, respectively, each projecting semi-radially inward from the outer surface of the body 301 and running parallel to the axis of the passages 337a, 337b. The slots 347a, 347c, 347b, 347d enable resilient biasing of the side walls of the shafts 337a, 337b to allow insertion of a shaft 305a, 305b radially into the circular portion of the keyhole shape, via the constriction 345a, 345b. A shaft 305a can be inserted radially into the flared portion of the keyhole shaped passage 337a. If a pressure is applied to the shaft 305a radially, then the shaft 305a can force the side walls of the passage 337a apart, widening the constriction 345a. The shaft 305a can then move into the circular portion of the keyhole shaped passage 337a, and the constriction 345a returns to its original size. The body 301 is also provided with two wings 315a, 315b, substantially the same as the wings 15a, 15b, diametrically opposed around the circumference of the body 301, and offset from the passages 337a, 337b.

FIG. 23 shows a cross-section along line E-E of a fixing device having the body shown in FIG. 17, when inserted into a wall. The arms 319a, 319b, substantially the same as the arms 19a, 19b, are shown in their retracted position. The arms 19a, 19b are coupled to respective flanges 317a, 317b. The wings 315a, 315b are shown having cut into plasterboard 323, which is bonded to masonry wall 325 with adhesive 327, to form a cavity 328. The cavity 328 may vary in thickness between 10 mm and 25 mm, depending on the thickness of the adhesive 327 at the time the plasterboard 323 was placed in position against the wall 325. An anchor 329, in the form of a countersunk bolt with a screw thread engages with the complementary screw thread in the anchor receiving aperture 303 is located in the anchor receiving aperture 303. The anchor 329 anchors a plate 335 to the plasterboard 323 by means of a corresponding countersunk arrangement (i.e. conical hole arrangement) at one end of a through-hole in the plate 335. The plate 335 shown is a flat sheet with a depth of 3-4 mm, and having a width substantially greater than the diameter of the body 301. If the body 301 has been over-inserted into the plasterboard 323, such that the front surface lies within the hole in the plasterboard, below the front of the plasterboard 323, then anchoring the plate 335 to the body 301 by means of anchor 329 will draw the body 301 into a position flush with the surface of the plasterboard 323. For instance, tightening the anchor 329 draws the body 301 toward the plate 335, by means of the complementary screw threads and thereby draws the arms 19a, 19b against the rear surface of the plasterboard 323.

FIG. 24 shows a rear view of the fixing device shown in FIG. 23, with the arms 319a, 319b shown in the retracted position. The body 301 is provided with stops 321a, 321b, substantially the same as the stops 21a, 21b. To accommodate a larger activation member on the tool, cut-out regions 324 are formed in the wings 319a, 319b, of a size so as not to overlap the slot 304. The cut-out regions 324 may be formed by cutting out portions from pre-formed wings 319a, 319b; however, in preferred embodiments, the cut-out regions 324 are integrally formed with the wings 319a, 319b. For instance, the wings 319a, 319b may be cast, pressed or cut to include the cut-out regions 324.

FIG. 25 shows the same view of the fixing device as FIG. 24, but with the arms 319a, 319b in the optimal extended position, abutting stops 321a, 321b respectively.

Figure 26:
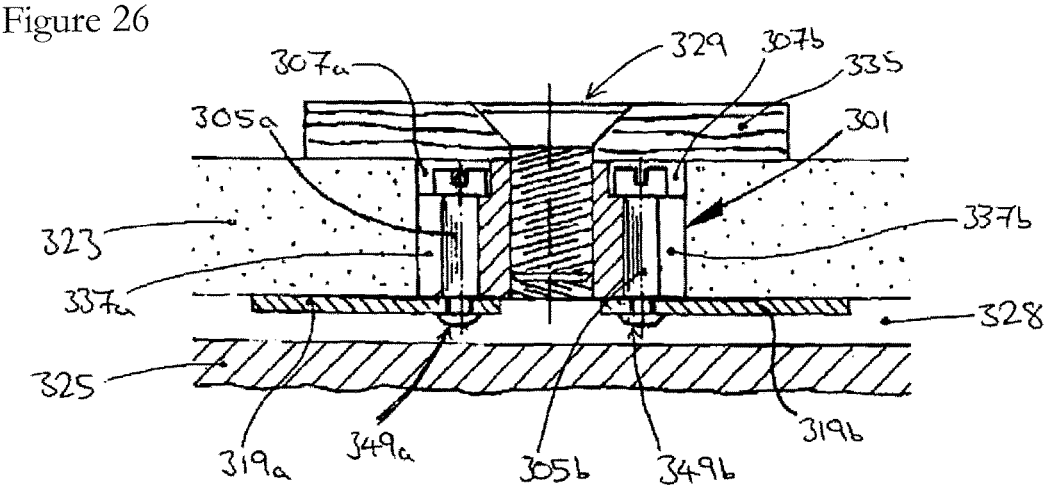
FIG. 26 is a cross-sectional view of a fixing device incorporating various optional features.

FIG. 26 shows a cross-section along line F-F of a fixing device having the body shown in FIG. 22, when inserted into a wall. The arms 319a, 319b have been coupled to their respective shafts 305a, 305b using respective flanges 349a, 349b. The flanges 349a, 349b are each formed in a mushroom shape comprising a narrow portion, for insertion through a hole in one of the arms 319a, 319b, and a head portion for retaining the arm 319a, 319b on the shaft, the head portion having a larger diameter than that of the hole. The narrow portion of the flange 349a, 349b is passed through the hole in the arms 319a, 319b, before coupling securely to the main part of the shaft 305a, 305b. Welding the flange 349a, 349b to the arm 319a, 319b secures the two components together.

Figure 27:
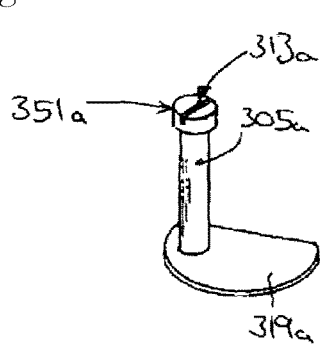
FIG. 27 is a perspective view of a component of the fixing device of FIG. 26.

FIG. 27 shows a perspective view of an actuation member in accordance with the fixing device shown in FIG. 26 that comprises a shaft 305a, having an enlarged head 351a and a slot screw drive 313a, and an arm 319a coupled thereto. The enlarged head 351a is substantially cylindrical in shape, and is positioned axially at one end of the shaft. The diameter of the enlarged head is larger than the diameter of the shaft and the diameter of the circular cross-section portion of the passage 337a. The enlarged head therefore substantially limits axial movement of the shaft through the passage.

Figure 28:
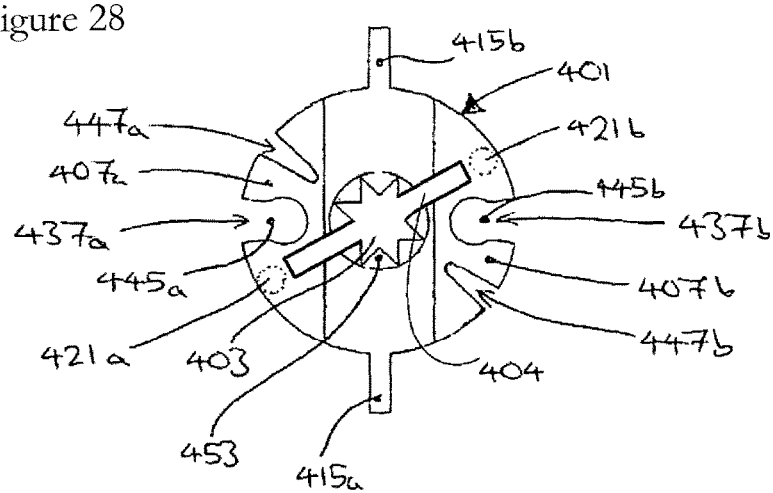
FIG. 28 is a perspective view of the fixing device of FIG. 26.

FIG. 28 shows a body 401 of a fixing device. The body 401 is of a substantially cylindrical form, having an axial depth of approximately 11.5 mm and a diameter of approximately 16 mm. The body 401 has an anchor receiving aperture 403, which passes axially through the body 401, is provided splines 453 that project radially into the centre of the anchor receiving aperture 403, and has a diameter of approximately 4.5 mm. A slot 404 is formed in a similar manner to the slot 4. The body 401 also includes two passages 437a, 437b that extend through the body 401, each passage 437a, 437b having an axis parallel to, and spaced from, the axis of the anchor receiving aperture 403. The two passages 437a, 437b are disposed diametrically opposite one another around the body 401, set in from the edge of the body 401, and are provided within respective recesses 407a, 407b, substantially the same as recesses 7a, 7b, in the top surface. Each passage 437a, 437b has an open-sided keyhole-shaped cross-section, and includes a constriction 445a, 445b for retaining a shaft within the circular portion of the keyhole shape. On one side of each passage 437a, 437b is provided a slot 447a, 447b, respectively, each projecting radially inward from the outer surface of the body 401 and running parallel to the axis of the passages 437a, 437b. The slots 447a, 447b, enable resilient biasing of one of the side walls of the shafts 437a, 437b to allow insertion of a shaft 305a, 305b radially into the circular portion of the keyhole shape, via the constriction 445a, 445b. A shaft 305a can be inserted radially into the flared portion of the keyhole shaped passage 437a. If a pressure is applied to the shaft 305a radially, then the shaft 305a can force the side walls of the passage 437a apart, widening the constriction 445a. The shaft 305a can then move into the circular portion of the keyhole shaped passage 437a, and the constriction 445a returns to its original size. The body 401 is also provided with two wings 415a, 415b, substantially the same as the wings 15a, 15b, diametrically opposed around the circumference of the body 401, and offset from the passages 437a, 437b.

Figure 29:
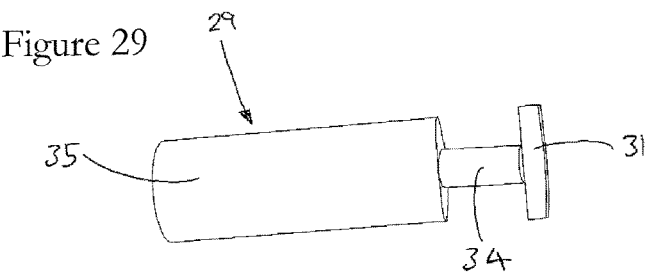
FIG. 29 is a perspective view of a tool.

FIG. 29 shows a perspective view of the activation tool 29, with the activation member 31, the shaft 34 and the handle 35.

FIG. 30 shows a fixing device, comprising a body 501, being substantially cylindrical in shape and defining a hollow cavity therein. The body 501 has a diameter for insertion into a hole of approximately 13 mm and a depth of approximately 17 mm. The body 501 includes a casing 557, configured to sit within a hole in a plasterboard sheet, and an integral plate 555 that forms the top surface of the body 501, and has a diameter larger than the diameter for insertion into a hole, of approximately 14 mm. The body 501 is provided centrally with a threaded anchor receiving aperture 503 in the integral plate 555 that extends from the top surface of the body 501 into the hollow cavity. The body is further provided with first and second shafts 505a, 505b, provided within respective first and second passages that are parallel to and axially spaced from the axis of the anchor receiving aperture 503, and extend from the top surface of the body 501, through the hollow cavity to the lower surface of the body 501. The passages are unthreaded, and circular in cross-section. Nuts 559a, 559b are provided on top ends of the respective shafts 505a, 505b. Each shaft 505a, 505b is provided with a respective slot screw drive 513a, 513b, also on their top ends, substantially the same as the screw drives 13a, 13b.

FIG. 31 shows the fixing device of FIG. 30 inserted into plasterboard 523. Each shaft 505a, 505b is threaded 561a, 561b at its top end in order to threadably receive a respective nut 559a, 559b thereon. Each shaft 505a, 505b has at a flange 517a, 517b disposed on its lower end for the coupling of a respective arm 519a, 519b thereto. The flanges 517a, 517b, arms 519a, 519b and their means of coupling are substantially the same as described in respect of flanges 17a, 17b and arms 19a, 19b. Movement of the arms 519a, 519b between their respective extended and retracted positions is substantially the same as that described with respect to arms 19a, 19b. The shafts 505a, 505b may be individually rotated in order to move the arms 519a, 519b from a retracted position into the extended position shown in FIG. 25. Tightening the nuts 559a, 559b on the shafts 505a, 505b draws the arms 519a, 519b against the rear surface of the plasterboard 523 adjacent the cavity 528. Pressure between the arms 519a, 519b and the integral plate 555 holds the fixing device securely in the plasterboard 523. A forged steel eye bolt 529 is threadably received in the anchor receiving aperture 503. The forged steel eye bolt 529 secures a cap 563 over the integral plate 555 such that access to the nuts 559a, 559b is prevented without removal of the cap 563. The cap 563 is substantially cup-shaped, and includes a hole in its flat end for receiving the forged steel eye bolt 529 therethrough.

FIG. 32 shows a rear view of the fixing device of FIGS. 30 and 31 with the arms 519a, 519b shown in the retracted position.

FIG. 33 shows the same view as FIG. 32, but with the arms 519a, 519b shown in the extended position.

Figure 34:
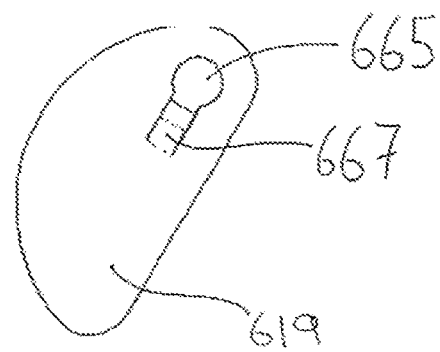
FIG. 34 is a rear view of an arm.

FIG. 34 shows an arm 619, having a hole 665 therethrough at one end, and a tongue 667 adjacent the hole 665. The tongue is formed by partially cutting out a portion of the flat arm 619, which is then bent out of the plane of the flat arm 619.

Figure 35:
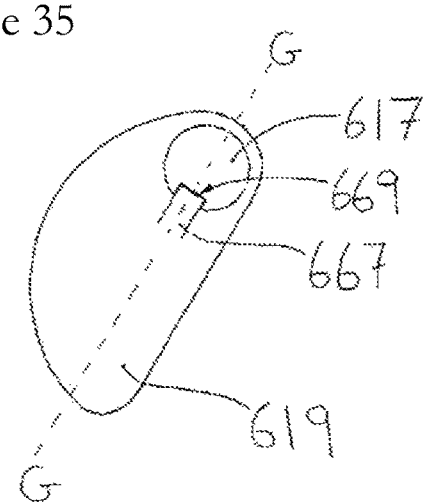
FIG. 35 is a rear view of an arm and shaft arrangement.

FIG. 35 shows the arm 619 having a shaft (605, not shown) located within the hole 665. At one end of the shaft 605 is a flange 617. The shaft 605, excluding the flange 617, may be configured in the same way as any shaft previously described herein. The flange 617 has a socket 669 for receiving the tongue 667 therein, when the shaft 605 has been fully inserted into the hole 665. The socket 669 is sized to receive the tongue 667 in a close fit, so that there is substantially no rotational movement between the shaft 605 and the arm 619, about the axis of the shaft 605.

Figure 36:
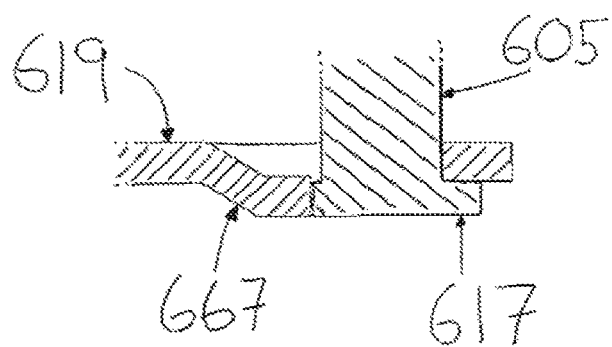
FIG. 36 is a cross-sectional view of the arrangement of FIG. 35.

FIG. 36 shows a partial cross section of the arrangement of FIG. 14 along the line G-G. The flange 617 abuts the rear face of the arm 619 to prevent axial movement of the shaft 605 in one direction through the hole 665. The shaft may comprise limiting means such as an enlarged head or a circlip, as hereinbefore described. Once the shaft 605 is inserted into a passage of a fixing device body, the arm 619 is held between the rear surface of the body and the flange 617, so as to prevent any movement of the arm 619 along the axis of the shaft 605. Further, the engagement of the tongue 667 with the socket 669 prevents any movement of the arm 619 rotationally about the axis of the shaft 605, relative to the shaft 605. Accordingly, rotation of the shaft 605 about its axis causes corresponding rotation of the arm 619 about the shaft's 605 axis.

What is claimed is:

1. A fixing device for securing into a hole in plasterboard, the fixing device comprising:
  a body comprising:
    an anchor receiving aperture in a first face of the body; and
    a passage that extends within the body from the first face to a second face opposite the first face, the passage being spaced from the anchor receiving aperture;
  a shaft provided within the passage and extending from the first face to the second face, the shaft being rotatably movable within the passage;
  a retaining member coupled to the shaft adjacent to the second face, and configured to be movable between an extended position, in which the fixing device is retainable in said hole, and a retracted position, in which the fixing device is removably insertable into said hole; and at least one over-insertion stop arranged to project away from the body in a direction substantially parallel to the first face such that over-insertion of the body into a hole is prevented;

wherein the over-insertion stop is configured to be moveable between a first position adjacent to the first face of the body, and a second position spaced from the first face of the body in a direction away from the second face of the body, such that the body is insertable into a hole to a depth greater than a distance between the first face and the second face.

2. The fixing device of claim 1, further comprising a collar on which the over-insertion stop is provided, the collar configured to slidably receive the body therein.

3. The fixing device of claim 2, wherein the collar further comprises an interior flange and the body further comprises an exterior flange, the interior and exterior flanges arranged to cooperate such that movement of the over-insertion stop beyond the second position is prevented.

4. The fixing device of claim 1, in which the shaft is rotatably movable, independent of axial movement, within the passage.

5. The fixing device of claim 1, in which the passage is disposed in a recess in the body.

6. The fixing device of claim 1, in which the shaft has limiting means for limiting relative axial movement of the shaft within the passage.

7. The fixing device of claim 1, in which the retaining member is a substantially flat arm.

8. The fixing device of claim 1, wherein:
the body has more than one passage;
a shaft is provided within each of said passage(s), the shafts being rotatably movable within their respective passage; and
a retaining member is coupled to each of said shafts and configured to be movable between a respective extended position, in which the device is retainable in a hole, and a respective retracted position, in which the fixing device is removably insertable into said hole.

9. The fixing device of claim 8, in which each retaining member is a substantially flat arm, and in which the total surface area, for contact with a flat surface, of all the arms is approximately equal to a cross-sectional area of the body.

10. The fixing device of claim 8, in which the passages are disposed substantially rotationally symmetrically about the anchor receiving aperture, and each passage has a respective passage axis that is arranged to be parallel to the aperture axis.

11. The fixing device of claim 1, further comprising at least one anti-rotation part for preventing rotation of the fixing device about an axis parallel to that of the anchor receiving aperture.

12. A fixing system including the fixing device of claim 1, the fixing system for securing the fixing device into a hole in plasterboard, wherein:

the anchor receiving aperture of the body has an aperture axis;
the body comprises:
a plurality of passages, each extending within the body, spaced from the anchor receiving aperture;
a respective shaft provided within each passage, each shaft being rotatably movable within the respective passage; and
a respective retaining member coupled to each shaft, each retaining member configured to be pivotally movable about the respective shaft between an extended position, in which the fixing device is retainable in said hole, and a retracted position, in which the fixing device is removably insertable into said hole; and
the fixing system comprises an activation tool, comprising an activation member arrangable such that rotation of the activation tool about an activation axis causes each retaining member to move from the retracted position to the extended position substantially simultaneously.

13. The fixing system of claim 12, in which the activation member is arrangable such that rotation of the activation tool about the activation axis causes the activation member to contact each retaining member to push each retaining member from the retracted position to the extended position.

14. The fixing system of claim 12, in which the activation tool further comprises a shaft connected to the activation member, the shaft configured to be removably insertable into the anchor receiving aperture.

15. The fixing system of claim 14, in which the body further comprises a slot therein, the slot arranged within the body so as to include the aperture axis, and the slot configured such that the activation member is removably insertable therethrough.

16. The fixing system of claim 15, in which the activation tool further comprises a stop located on the shaft, the stop arranged such that a distance along the shaft between the stop and the activation member is substantially equal to a thickness of the body along the aperture axis.

17. The fixing system of claim 12, in which the activation member is rotatably coupled to the body, and the activation member comprises a socket for receiving an end of a hand tool therein for rotation of the activation member about the activation axis.

18. The fixing system of claim 12, in which the activation axis is coaxial with the aperture axis.

19. A method of securing a fixing device into a hole in plasterboard, the method comprising the steps of:
providing a fixing device according to claims 1;
inserting the fixing device into a hole in a surface, such that the retaining members are placed behind a rear face of the surface; and
moving the retaining member from the retracted position to the extended position.

* * * * *